(12) United States Patent
Kazui

(10) Patent No.: US 10,375,392 B2
(45) Date of Patent: Aug. 6, 2019

(54) VIDEO ENCODING APPARATUS, VIDEO ENCODING METHOD, VIDEO DECODING APPARATUS, AND VIDEO DECODING METHOD

(71) Applicant: FUJITSU LIMITED, Kawasaki-shi, Kanagawa (JP)

(72) Inventor: Kimihiko Kazui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 15/837,981

(22) Filed: Dec. 11, 2017

(65) Prior Publication Data

US 2018/0184087 A1 Jun. 28, 2018

(30) Foreign Application Priority Data

Dec. 28, 2016 (JP) .................................. 2016-257055

(51) Int. Cl.
*H04N 7/12* (2006.01)
*H04N 11/02* (2006.01)
(Continued)

(52) U.S. Cl.
CPC ......... *H04N 19/117* (2014.11); *H04N 19/105* (2014.11); *H04N 19/124* (2014.11);
(Continued)

(58) Field of Classification Search
CPC .... H04N 19/117; H04N 19/132; H04N 19/86; H04N 19/124; H04N 19/105; H04N 19/139; H04N 19/18; H04N 19/513

See application file for complete search history.

(56) References Cited

U.S. PATENT DOCUMENTS

| | | | |
|---|---|---|---|
| 2002/0034251 A1* | 3/2002 | Suzuki | H04N 19/105 375/240.16 |
| 2005/0129320 A1* | 6/2005 | Koto | H04N 19/147 382/239 |

(Continued)

FOREIGN PATENT DOCUMENTS

| | | |
|---|---|---|
| JP | 2013-236358 | 11/2013 |
| JP | 2015-104061 | 6/2015 |

OTHER PUBLICATIONS

"High efficiency video coding"; H.265, Series H: Audiovisual and Multimedia Systems, Infrastructure of audiovisual services—coding of moving video; Telecommunication Standardization Sector of International Telecommunications Union; Apr. 2015, 634 pp.

(Continued)

*Primary Examiner* — Talha M Nawaz
(74) *Attorney, Agent, or Firm* — Staas & Halsey LLP

(57) ABSTRACT

A video encoding apparatus corrects filter coefficients of an in-loop filter applied to an encoded reference block adjacent to a block to be encoded, based on a quantization value applied to the reference block and a quantization value applied to the block to be encoded when a mode of an in-loop filter applied to the block to be encoded is same as a mode of the in-loop filter applied to the reference block, uses the corrected filter coefficients to apply the in-loop filter to a locally-decoded block that is obtained by encoding the block to be encoded once and decoding the encoded block to be encoded, and adds, to encoded data of the block to be encoded, information indicating that the block to be encoded refers to the reference block for the in-loop filter.

11 Claims, 11 Drawing Sheets

(51) Int. Cl.

| | |
|---|---|
| *H04N 11/04* | (2006.01) |
| *H04N 19/117* | (2014.01) |
| *H04N 19/82* | (2014.01) |
| *H04N 19/176* | (2014.01) |
| *H04N 19/124* | (2014.01) |
| *H04N 19/139* | (2014.01) |
| *H04N 19/18* | (2014.01) |
| *H04N 19/513* | (2014.01) |
| *H04N 19/105* | (2014.01) |
| *H04N 19/157* | (2014.01) |
| *H04N 19/70* | (2014.01) |

(52) U.S. Cl.
CPC ......... *H04N 19/139* (2014.11); *H04N 19/157* (2014.11); *H04N 19/176* (2014.11); *H04N 19/18* (2014.11); *H04N 19/521* (2014.11); *H04N 19/82* (2014.11); *H04N 19/70* (2014.11)

(56) References Cited

U.S. PATENT DOCUMENTS

| | | | |
|---|---|---|---|
| 2006/0050786 A1* | 3/2006 | Tanizawa | H04N 19/176 375/240.03 |
| 2013/0083858 A1* | 4/2013 | Moriyoshi | H03M 7/40 375/240.23 |
| 2014/0192869 A1 | 7/2014 | Laroche et al. | |
| 2015/0010052 A1 | 1/2015 | Mody et al. | |
| 2015/0049804 A1* | 2/2015 | Shimada | H04N 19/86 375/240.03 |

OTHER PUBLICATIONS

Fu et al., "Sample Adaptive Offset in the HEVC Standard," IEEE Transactions on Circuits and Systems for Video Technology, vol. 22, No. 12, Dec. 2012, pp. 1755-1764.

Extended European Search Report dated Apr. 30, 2018, in corresponding European Patent Application No. 17206970.0, 8 pp.

* cited by examiner

VIDEO ENCODING APPARATUS, VIDEO ENCODING METHOD, VIDEO DECODING APPARATUS, AND VIDEO DECODING METHOD

CROSS-REFERENCE TO RELATED APPLICATION

This application is based upon and claims the benefit of priority of the prior Japanese Patent Application No. 2016-257055, filed on Dec. 28, 2016, and the entire contents of which are incorporated herein by reference.

FIELD

The embodiments discussed herein are related to a video encoding apparatus, a video encoding method, a video decoding apparatus, and a video decoding method.

BACKGROUND

Typically, video data includes a large amount of data. Therefore, an apparatus that handles the video data encodes and compresses the video data in order to transmit the video data to other apparatus or to store the video data in a storage device. Advanced video coding (MPEG-4 AVC/ITU-H H.264) and high efficiency video coding (HEVC/ITU-T H.265) were developed as typical video coding standards.

In such coding standards, a picture to be encoded is divided into a plurality of blocks. A prediction block is generated for each block to be encoded from another encoded picture or an encoded region of the picture to be encoded. Quantization of orthogonal transform coefficients that are obtained by performing orthogonal transformation on prediction error signals between the block to be encoded and the prediction block achieves compression of an information volume.

The image quality of a reproduced picture that is obtained by decoding the encoded picture data, however, is deteriorated by the quantization of the orthogonal transform coefficients, as compared with the image quality of the original picture. Therefore, a deblocking filter has been adopted since MPEG-4 AVC, as an in-loop filter to suppress deterioration caused by the quantization of the orthogonal transform coefficients. Further, quantization may cause artifacts that are referred to as mosquito distortion, near the edge of an object in the picture. Accordingly, in HEVC, a sample adaptive offset (SAO) filter that is a type of adaptive filter is adopted as the in-loop filter, in addition to the deblocking filter (for example, see Japanese Unexamined Patent Publication (Kokai) No. 2015-104061, and ISO/IEC 23008-2: 2015 Information technology—High efficiency coding and media delivery in heterogeneous environments—Part 2: High efficiency video coding, 2015).

SUMMARY

An SAO filter is an example of a post-filter that is applied after the deblocking processing. The SAO filter includes two modes of a band offset and an edge offset, and application of the two modes and application of the SAO filter is selectable on a coding tree unit (CTU) basis. Further, parameters of the SAO filter that are used when the SAO filter is applied are also selectable on a CTU basis. In the following, various kinds of parameters used in the SAO filter and a parameter indicating whether or not the SAO filter is applied are simply referred to as SAO parameters.

When all of the determined SAO parameters are transmitted, the information volume of the SAO parameters themselves may be non-negligible. Accordingly, in HEVC, a mode in which the SAO parameters of the encoded CTU that is adjacent to left side or upper side of the CTU to be encoded are also applied to the CTU to be encoded (hereinafter, referred to as an SAO merge mode, or simply referred to as a merge mode) is prepared. More specifically, in HEVC, two flags SaoMergeLeftFlag and SaoMergeUpFlag that are signaled on a CTU basis are prepared to indicate whether the SAO merge mode is applied. When the flag SaoMergeLeftFlag is set to '1', the SAO parameters of the CTU that is adjacent to the left side of the CTU to be encoded are also used as the SAO parameters of the CTU to be encoded. In addition, when the flag SaoMergeLeftFlag is set to '0' and the flag SaoMergeUpFlag is set to '1', the SAO parameters of the CTU that is adjacent to the upper side of the CTU to be encoded are also used as the SAO parameters of the CTU to be encoded.

The degree of deterioration of the image quality caused by the quantization varies depending on a quantization width. Therefore, when the applied quantization width varies, the appropriate SAO parameters also vary. In contrast, to achieve fixed bit rate control, in HEVC, a quantization value that defines the quantization width of the orthogonal transform coefficients is adjustable within a picture, similar to the other coding standards. The quantization value in HEVC is varied on a quantization group basis. In other words, the video encoding apparatus individually sets the quantization value for each quantization group. The quantization group is a group of coding units (CUs) each having a size equal to or lower than a value calculated from a parameter diff_cu_qp_delta_depth. For example, when the size of the CTU is 64 ($=2^6$)*64 and the parameter diff_cu_qp_delta_depth is set to 1, the CU having the size of 32 ($=2^{(6-1)}$32) or larger becomes an individual quantization group. In contrast, when the size of the CU is 16*16, four CUs (corresponding to 32*32) successive in processing order belong to one quantization group. Note that the number of quantization groups included in the CTU is not limited to one and may be plural.

When the CTU to be encoded and the adjacent CTU have similar pixel value distributions and the same quantization value is applied thereto, the mosquito distortion occurring near the edge in each of the two CTUs is substantially the same in magnitude. Therefore, application of the merge mode allows the video encoding apparatus to reduce the volume of encoding information relating to the SAO parameters while suppressing the mosquito distortion of the CTU to be encoded. When quantization values different from each other are applied to the CTU to be encoded and the adjacent CTU, however, the magnitude of the mosquito distortion becomes different between these two CTUs. Therefore, if the SAO parameters of the adjacent CTU are applied to the CTU to be encoded, mosquito distortion occurring in the CTU to be encoded may not be sufficiently removed.

According to an embodiment, a video encoding apparatus that encodes a block to be encoded among a plurality of blocks obtained by dividing a picture to be encoded included in the video data is provided. The video encoding apparatus includes: a processor configured to: perform orthogonal transformation on prediction error signals of respective pixels in the block to be encoded, to calculate orthogonal transform coefficients, and quantize the orthogonal transform coefficients based on a quantization value applied to the block to be encoded, to encode the block to be encoded; decode the encoded block to be encoded, to generate a locally-decoded block; correct filter coefficients of an in-loop filter applied to an encoded reference block adjacent to the block to be encoded, based on a quantization value applied to the reference block and the quantization value applied to the block to be encoded, to calculate corrected filter coefficients, when a mode of an in-loop filter applied to the block to be encoded is the same as a mode of the in-loop filter applied to the reference block; use the corrected filter coefficients to apply the in-loop filter to the locally-decoded block; and add, to encoded data of the block to be encoded, information indicating that the block to be encoded refers to the reference block for the in-loop filter.

Further, according to another embodiment, a video decoding apparatus that decodes a block to be decoded among a plurality of blocks obtained by dividing a picture to be decoded included in the encoded video data is provided. The video decoding apparatus includes: a processor configured to: inversely quantize quantization coefficients included in encoded data of the block to be decoded, based on a quantization value applied to the block to be decoded, to calculate orthogonal transform coefficients; perform inverse orthogonal transformation on the orthogonal transform coefficients to calculate prediction error signals of respective pixels in the block to be decoded; decode the block to be decoded, based on the prediction error signals of the respective pixels; correct filter coefficients of an in-loop filter applied to a decoded reference block adjacent to the block to be decoded, included in the encoded video data, based on a quantization value applied to the reference block and the quantization value applied to the block to be decoded, to calculate corrected filter coefficients, when information indicating that the reference block is referred to for an in-loop filter is included in the encoded data of the block to be decoded; and use the corrected filter coefficients to apply the in-loop filter to the decoded block to be decoded.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A video encoding apparatus according to an embodiment will be described below with reference to drawings. When an SAO mode applied to a CTU to be encoded and an SAO mode applied to an encoded CTU adjacent to the CTU to be encoded are same as each other, the video encoding apparatus corrects the SAO parameters of the adjacent CTU based on quantization values respectively applied to the two CTUs. Then, the video encoding apparatus applies the corrected SAO parameters to the CTU to be encoded. As a result, the video encoding apparatus increases the number of CTUs to which an SAO merge mode is applicable while suppressing mosquito distortion caused by quantization, thereby improving encoding efficiency.

First, the SAO modes and the SAO parameters will be described.

Figure 1:
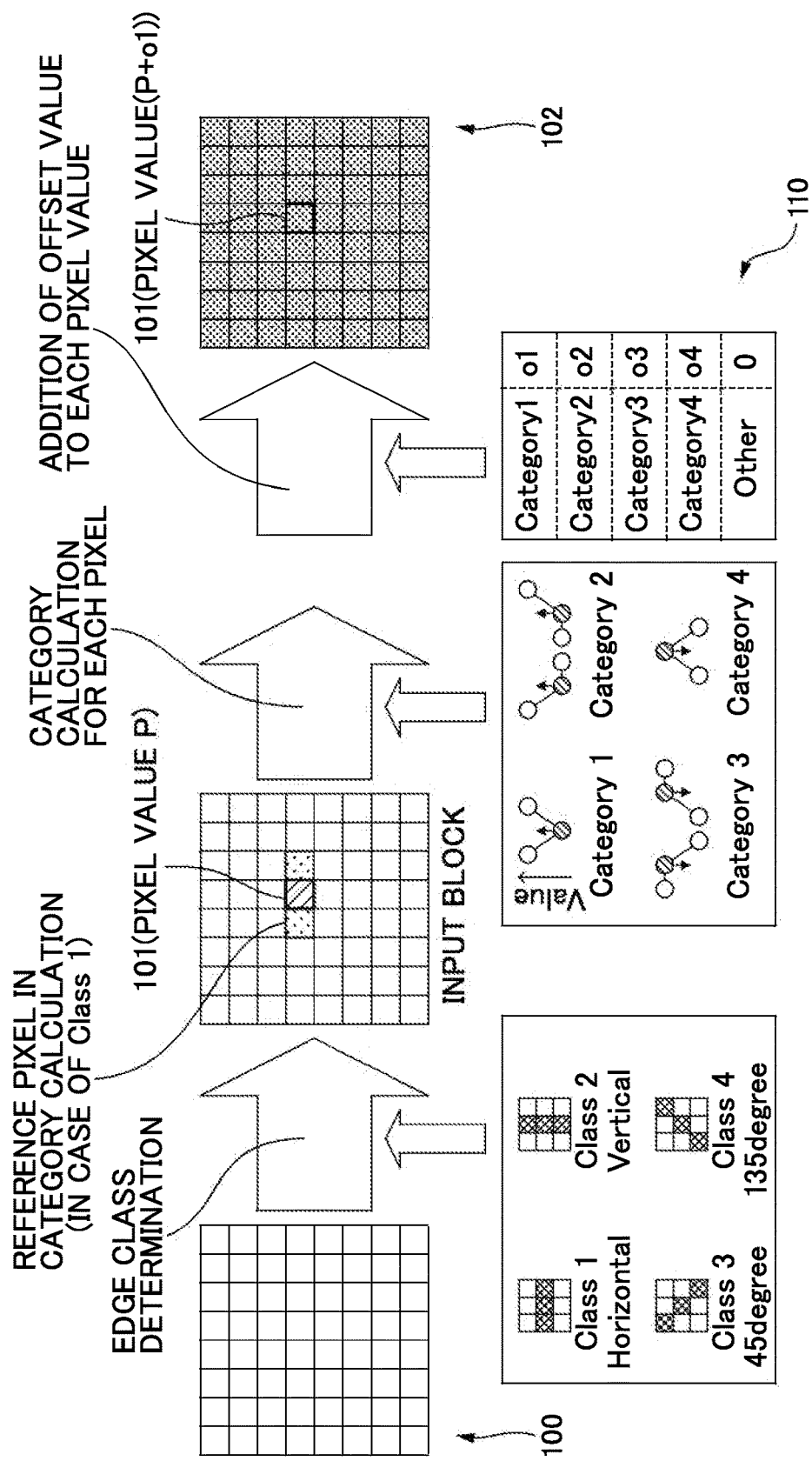
FIG. 1 is an explanatory diagram of the outline of an edge offset.

FIG. 1 is an explanatory diagram of the outline of an edge offset that is one of the SAO modes. The edge offset is a filter that selects one edge direction over an entire CTU 100, and adds, to each pixel in the CTU 100, an offset value corresponding to a category that represents the shape of the pixel value variation in the selected edge direction. Note that, in the video encoding apparatus, for example, the CTU 100 is a CTU that has been locally decoded and processed with a deblocking filter. The edge direction is classified into any of four classes (class 1: horizontal direction, class 2: vertical direction, class 3: 45 degrees direction, class 4: 135 degrees direction). For example, the edge intensity for each class is calculated for each of the pixels in the CTU 100 in accordance with a first order differential filter or a second order differential filter, and a class in which a mean value of the edge intensity becomes the maximum is selected.

In addition, the shape of the pixel value variation in the selected direction is classified into any of five categories (category 1, category 2, category 3, category 4, and others). The magnitude of the pixel value variation for each category is calculated along the selected direction for each of the pixels in the CTU 100, and each of pixels is classified into the category in which the magnitude of the pixel value variation becomes the largest. For example, in a case where the selected direction is class 1, when the pixel value variation of a pixel 101 in the CTU 101 is examined, the pixels adjacent to the right side and the left side of the pixel 101 are referred to. The offset values of the respective categories are calculated so as to minimize the sum of the absolute differences of the pixel values of the corresponding pixels between an original CTU corresponding to the CTU 100 and a CTU 102 to which the edge offset has been applied. Further, the offset value of the category corresponding to each of the pixels in the CTU 100 is added to the value of the pixel, which results in the CTU 102 to which the edge offset has been applied. For example, when the shape of the pixel value variation of the pixel 101 (having the pixel value p) in the CTU 100 is classified into category 1, an offset value o1 of category 1 among the offset values of the respective categories illustrated in a table 110 is added to the pixel value p. Accordingly, in the CTU 102 to which the edge offset has been applied, the pixel value of the pixel 101 becomes (p+o1).

Figure 2:
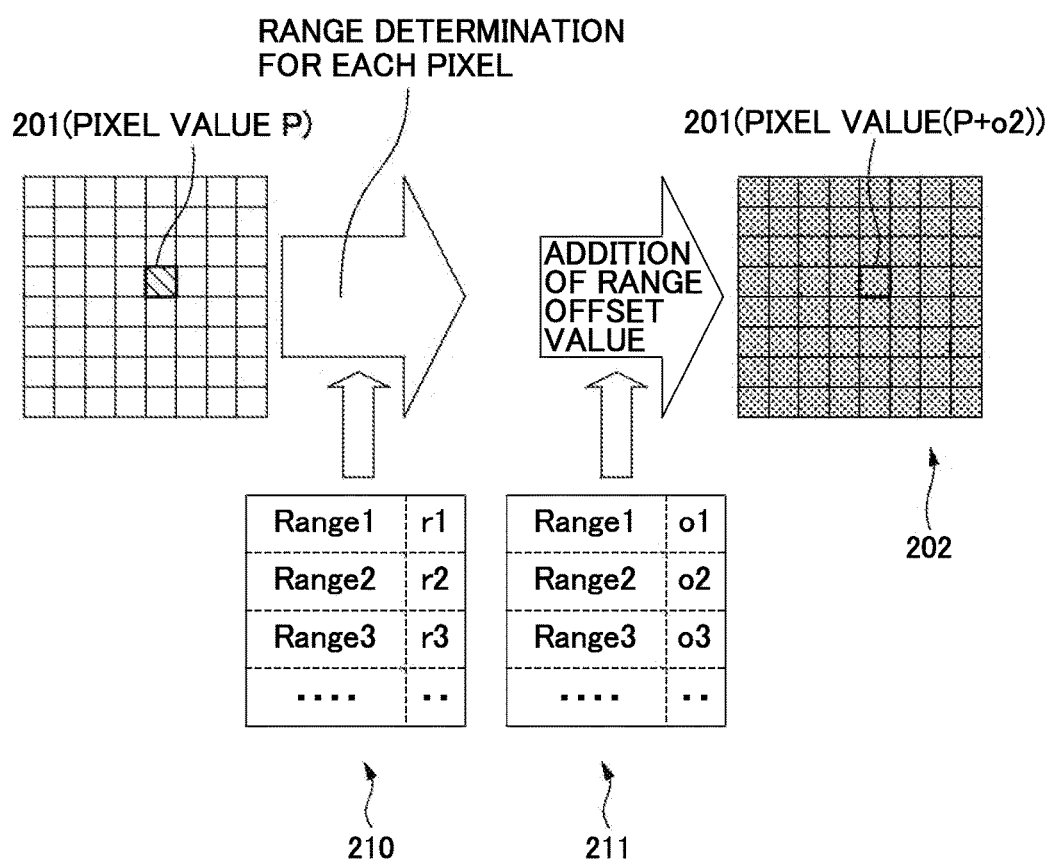
FIG. 2 is an explanatory diagram of the outline of a band offset.

FIG. 2 is an explanatory diagram of the outline of a band offset that is one of the other SAO modes. The band offset is a filter that adds, to each pixel in a CTU 200, an offset value corresponding to a range of pixel values to which the value of each pixel belongs. Note that, in the video encoding apparatus, for example, the CTU 200 is also the CTU that has been locally decoded and processed with the deblocking filter. For example, a possible range of pixel values (for example, 0 to 255) is divided at equal intervals by a predetermined number to set a plurality of ranges. In other words, an upper limit pixel value and a lower limit pixel value are set for each of the ranges, and the ranges do not overlap with one another. As illustrated in a table 210, the ranges to which the respective pixels in the CTU 200 belong are determined. Further, as illustrated in a table 211, the offset values corresponding to the respective ranges are set. Note that the offset values of the respective ranges are calculated so as to minimize the sum of the absolute differences of the pixel values of the corresponding pixels between an original CTU corresponding to the CTU 200 and a CTU 202 to which the band offset has been applied. Further, the offset value of the range corresponding to each of the pixels in the CTU 200 is added to the value of the pixel, which results in the CTU 202 to which the band offset has been applied. For example, when the pixel value p of a pixel 201 in the CTU 200 belongs to a range 2, an offset value o2 of range 2 among the offset values of the respective ranges illustrated in the table 211 is added to the pixel value p. Accordingly, in the CTU 202 to which the band offset has been applied, the pixel value of the pixel 201 becomes (p+o2).

Figure 3:
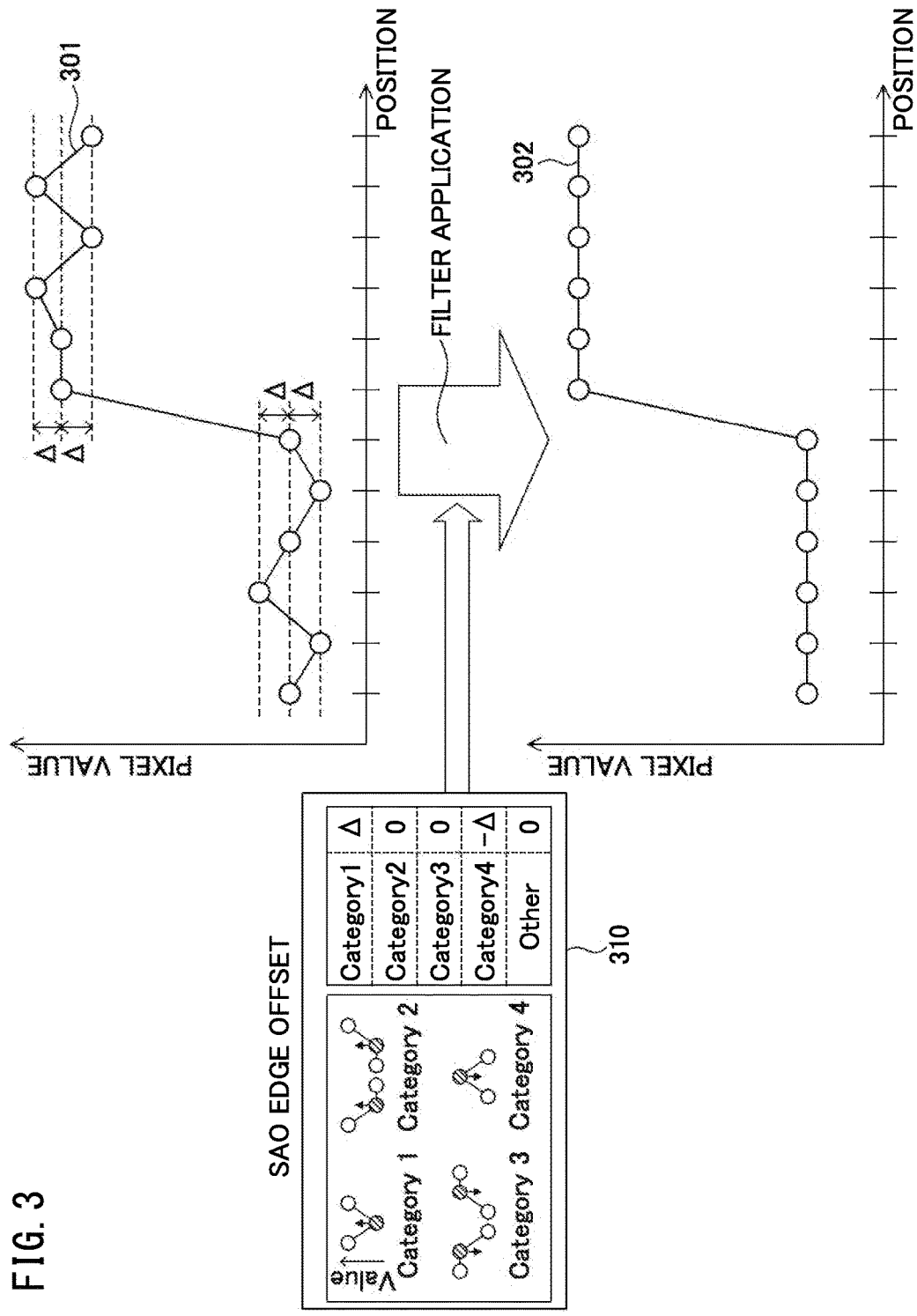
FIG. 3 is a diagram to explain variation of pixel values before and after applying the edge offset.

FIG. 3 is a diagram to explain the variation of the pixel values before and after the application of the edge offset. In FIG. 3, the lateral axis indicates a position on the CTU, and the vertical axis indicates a pixel value. A profile 301 that schematically illustrates the pixel value variation in one pixel column in the CTU that has been locally decoded and processed with the deblocking filter is illustrated on an upper part in FIG. 3. As illustrated in profile 301, mosquito distortion 311 in which the pixel values vary within a range from $-\Delta$ to $\Delta$ occurs on a flat part near the edge, in particular, when a high-frequency component of the orthogonal transform coefficient is roughly quantized in quantization of the orthogonal transform coefficient. The width of the variation $\Delta$ of the pixel values is proportional to the quantization value. In this case, for example, the offset values of the respective categories are as illustrated in a table 310. Accordingly, the edge offset is applied to the pixels in the CTU, the variation $\Delta$ is added to the value of the pixel in category 1 (the minimum value), and the variation $\Delta$ is subtracted from the value of the pixel in category 4 (the maximum value), which cancels the mosquito distortion. As a result, variation of the pixel value after the applying the edge offset in the same pixel column is smoothed on the flat part other than the edge, as with a profile 302 illustrated on the lower part in FIG. 3.

A flag of the applied SAO mode (one of the edge offset, the band offset, and no-filter application), the application class and the offset values of the respective categories in the edge offset, and the upper limits, the lower limits, and the offset values of the respective ranges in the band offset are included in the SAO parameters. In the present embodiment, when the edge offset is applied to both of the CTU to be encoded and the adjacent encoded CTU, the video encoding apparatus corrects the offset values of the respective categories applied to the adjacent CTU based on the quantization value of the quantization group belonging to each of the two CTUs. As a result, the offset values of the respective categories applied to the CTU to be encoded are calculated based on the offset values of the respective categories of the reference adjacent CTU. This allows the merge mode to be applicable to the CTU to be encoded.

Note that the picture may be any of a frame and a field. The frame is one still image in the video data, whereas the field is a still image that is obtained by extracting only data in odd rows or only data in even rows from the frame. In addition, the CTU is an example of a block that is obtained by dividing the picture into a plurality of blocks. Moreover, the offset values of the respective classes in the pixel value variation in the edge offset are examples of filter coefficients of an in-loop filter.

In the present embodiment, the video encoding apparatus encodes the video data in compliance with HEVC. The video encoding apparatus, however, may encode the video data in compliance with other coding standards that can apply the SAO merge mode and can adjust the quantization value for each block to be encoded.

Figure 4:
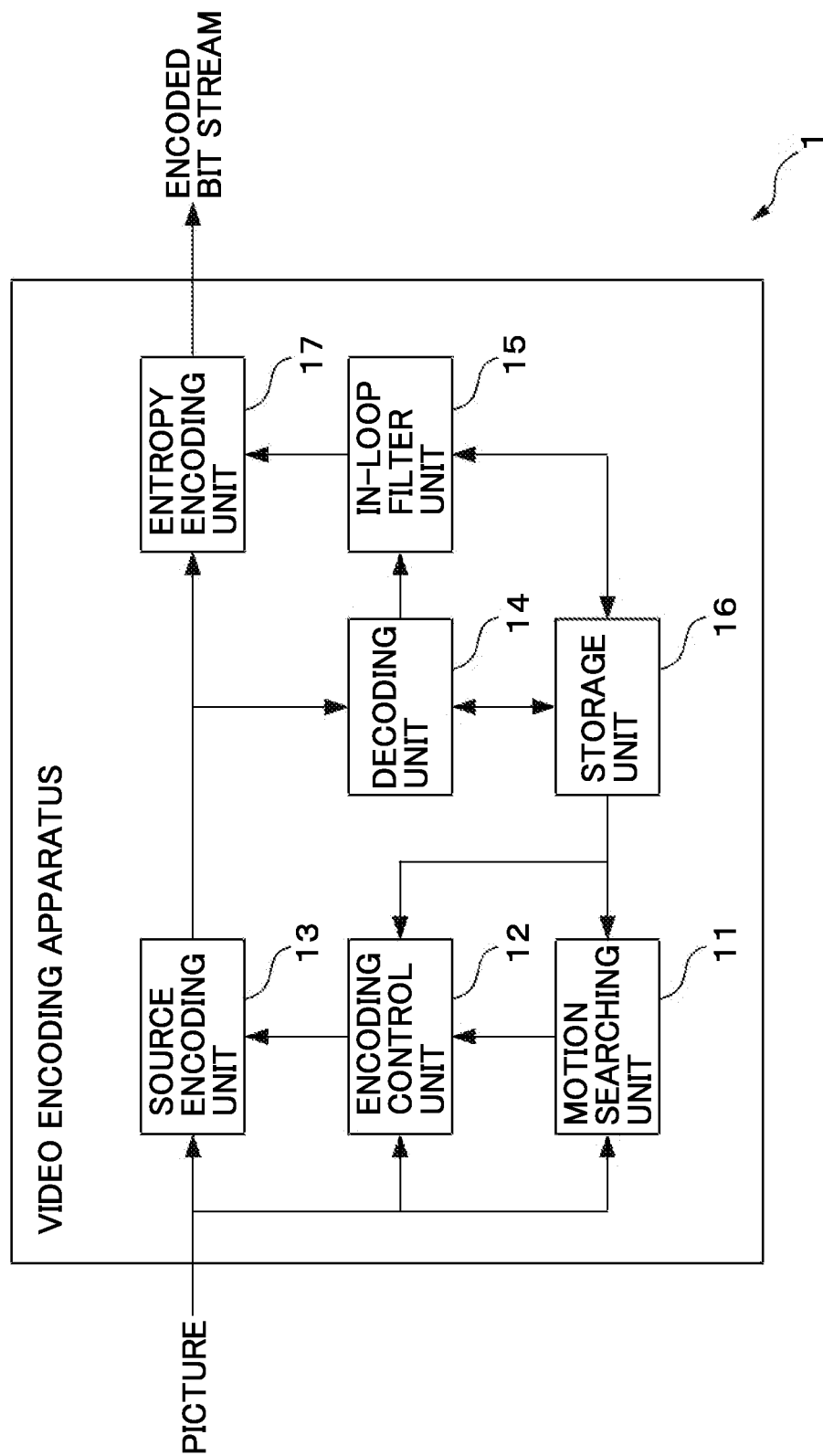
FIG. 4 is a schematic configuration diagram of a video encoding apparatus according to an embodiment.

FIG. 4 is a schematic configuration diagram of a video encoding apparatus according to an embodiment. A video encoding apparatus 1 includes a motion searching unit 11, an encoding control unit 12, a source encoding unit 13, a decoding unit 14, an in-loop filter unit 15, a storage unit 16, and an entropy encoding unit 17. These units included in the video encoding apparatus 1 are mounted as separate circuits on the video encoding apparatus 1. Alternatively, these units included in the video encoding apparatus 1 may be mounted as one or a plurality of integrated circuits in which circuits respectively achieving functions of the units are integrated, on the video encoding apparatus 1. Further alternatively, these units included in the video encoding apparatus 1 may be functional modules each achieved by a computer program executed on a processor provided in the video encoding apparatus 1.

The video encoding apparatus 1 encodes the CTUs of the picture to be encoded, in raster scan order. In the following, the units of the video encoding apparatus 1 are described with processing performed on one CTU, as an example.

When the picture to be encoded that includes the CTU to be encoded is a P picture or a B picture to which an inter-prediction encoding scheme is applicable, the motion searching unit 11 calculates motion vectors of respective applicable prediction units (PUs) in the CTU to be encoded. Note that the type of the picture to be encoded is determined based on the structure of a group of pictures (GOP) that is applied by a control unit (not illustrated) to the video data to be encoded and a position of the picture to be encoded in the GOP.

The motion searching unit 11 performs block matching on a referenceable region of the picture that has been encoded once and then decoded (hereinafter, referred to as locally-decoded picture) with a PU of interest in the CTU to be encoded, thereby specifying a reference block that is most coincident with the PU of interest. Further, the motion searching unit 11 calculates a vector that represents movement between the PU of interest and the reference block, as a motion vector. Note that, when the picture to be encoded is a B picture, the motion searching unit 11 calculates a motion vector in both of L0 prediction and L1 prediction. The motion searching unit 11 stores the motion vectors of respective PUs in the storage unit 16 and notifies the encoding control unit 12 of the motion vectors of the respective PUs.

The encoding control unit 12 determines a dividing mode of each of CU, PU, and TU to divide the CTU to be encoded, and an encoding mode to be applied to each CU. Further, the encoding control unit 12 determines quantization values of the respective quantization groups, and the SAO mode to be applied to the CTU to be encoded. Note that, for example, the quantization groups set in the CTU to be encoded may be set in advance.

The encoding control unit 12 determines the encoding mode of the CTU based on, for example, information that indicates the type of the picture to be encoded including the CTU to be encoded. The information is acquired from a control unit (unillustrated). When the type of the picture to be encoded is an I picture to which only an intra-prediction encoding scheme is applicable, the encoding control unit 12 selects the intra-prediction encoding scheme as the encoding mode to be applied. In contrast, when the type of the picture to be encoded is a P picture or a B picture, for example, the encoding control unit 12 selects one of the inter-prediction encoding scheme and the intra-prediction encoding scheme as the encoding mode to be applied.

The encoding control unit 12 calculates an encoding cost on a CU basis. The encoding cost is an evaluation value of the encoded data amount of the CTU to be encoded, for the applicable encoding mode. For example, as for the inter-prediction encoding scheme, the encoding control unit 12 calculates the encoding cost for each combination of the CU dividing mode to divide the CTU, the PU dividing mode, and a vector mode to define a method of generating a prediction motion vector. Note that the encoding control unit 12 can use, as the vector mode, for example, one of an adaptive motion vector prediction (AMVP) mode and a merge mode.

As for the intra-prediction encoding scheme, the encoding control unit 12 calculates the encoding cost for each combination of the CU dividing mode to divide the CTU, the PU dividing mode, and a prediction mode to define a method of generating a prediction block.

To calculate the encoding cost, the encoding control unit 12 calculates a prediction error of the PU of interest, i.e., a sum of the absolute differences of the pixels SAD, according to the following equation.

$$SAD=\Sigma|OrgPixel-PredPixel|$$

wherein, OrgPixel is the value of a pixel included in the PU of interest, and PredPixel is a value of a pixel included in the prediction block corresponding to the block of interest. The prediction block is generated in accordance with an encoding mode in which the encoding cost is calculated.

The encoding control unit 12 calculates the encoding cost Cost of the CU of interest, for example, according to the following equation.

$$Cost=\Sigma SAD+\lambda *B$$

wherein, $\Sigma SAD$ is the total sum of the SADs calculated for the respective PUs included in the CU of interest. In addition, B is an estimated code amount of items other than the prediction error, such as the motion vector, and the flag indicating the prediction mode. Further, $\lambda$ is a Lagrange undetermined multiplier.

Note that the encoding control unit 12 may calculate the sum of the absolute transformed differences of the Hadamard coefficients of the respective pixels in the Hadamard-transformed difference image between the PU of interest and the prediction block, in place of the SAD.

The encoding control unit 12 sets, for example, the CU of interest in order from a larger one among the available CU size, in the CTU to be encoded. Further, the encoding control unit 12 selects the prediction mode that minimizes the cost, for each PU dividing mode in the CU of interest, in the case of the intra-prediction encoding scheme. In addition, the encoding control unit 12 selects the vector mode that minimize the cost for each PU dividing mode in the CU of interest, in the case of the inter-prediction encoding scheme. Furthermore, the encoding control unit 12 selects the encoding scheme with lower encoding cost out of the intra-prediction encoding scheme and the inter-prediction encoding scheme, as the encoding scheme to be applied to each of CUs having the same size.

Further, the encoding control unit 12 performs similar processing while regarding each of the divided CUs that are obtained by dividing the CU of interest into four, as the next CU of interest, thereby calculating the minimum encoding cost. Thereafter, when the sum of the minimum encoding costs calculated for respective divided CUs is smaller than the minimum encoding cost for the CU of interest, the encoding control unit 12 divides the CU of interest into four. The encoding control unit 12 repeats the above-described processing until each CU is not divided, to determine the CU dividing mode and the PU dividing mode to be applied to the CTU to be encoded.

Further, the encoding control unit 12 determines the TU dividing mode for each CU according to the CU dividing mode determined in the above-described manner, and determines the SAO mode to be applied to the CTU to be encoded and the quantization values of the respective quantization groups. At this time, the encoding control unit 12 calculates, according to the following equation, an RD cost Cost for each combination of the applicable TU dividing mode, the SAO mode, and the quantization values of the respective quantization groups.

$$Cost=\Sigma_i(org(i)-ldec(i))^2+\lambda \cdot bit \qquad (1)$$

wherein, org(i) is the value of the pixel included in the CU of interest, and ldec(i) is the value of the pixel in the decoded CU that is obtained by encoding the CU of interest with use of the TU of interest dividing mode and further decoding the CU of interest. To calculate the value ldec(i), the encoding control unit 12 may perform the SAO filter processing on the pixels in the CU decoded according to the SAO mode of interest, thereby calculating the value ldec(i). Further, bit indicates a code amount when the CU of interest is encoded by use of the TU of interest dividing mode and quantization value of interest. Note that the encoding control unit 12 may set the quantization values of the respective quantization groups so as to encode the pictures at a constant bitrate (CBR).

The first term of the right side of equation (1) indicates coding distortion, and the second term of the right side indicates the code amount. Therefore, in a combination of the TU dividing mode, the SAO mode, and the quantization values of the respective quantization groups that minimizes the RD cost, the coding distortion and the code amount have appropriate balance. Therefore, the encoding control unit 12 selects a combination of the TU dividing mode, the SAO mode, and the quantization values of the respective quantization groups that minimizes the RD cost Cost.

The encoding control unit 12 notifies the source encoding unit 13 of the combination of the dividing mode of each of CU, PU, and TU and the encoding mode selected for the CTU to be encoded. Further, the encoding control unit 12 stores, in the storage unit 16, the combination of the dividing mode of each of CU, PU, and TU and the encoding mode selected for the CTU to be encoded. Moreover, the encoding control unit 12 notifies the in-loop filter unit 15 of the SAO mode to be applied.

The source encoding unit 13 calculates prediction error signals that indicate differences between the pixels in the CTU to be encoded and respective corresponding pixels in the prediction block generated on a PU basis, and performs orthogonal transformation on the prediction error signals of the respective pixels on a TU basis, thereby calculating orthogonal transform coefficients. Thereafter, the source encoding unit 13 quantizes the orthogonal transform coefficients of the respective TUs in accordance with the quantization values of the quantization groups to which the respective TUs belong.

First, the source encoding unit 13 generates the prediction block of each PU according to the combination of the dividing mode of each of CU and PU and the encoding mode selected for the CTU to be encoded. When intra-prediction encoding is performed on the CU, the source encoding unit 13 generates the prediction block based on the values of the pixels in an encoded region around the PU that are referred according to the prediction mode selected for each PU in the CU.

In contrast, when inter-prediction encoding is performed on the CU, the source encoding unit 13 generates the prediction block of each PU in the CU by compensating motion of the locally-decoded picture read from the storage unit 16 based on the motion vector calculated for each PU.

The source encoding unit 13 calculates the difference between the pixels in the CTU to be encoded and the respective corresponding pixels in the prediction block. Thereafter, the source encoding unit 13 calculates the prediction error signals from the difference values, obtained through the difference calculation, of the respective pixels in each TU of the CTU to be encoded.

Further, the source encoding unit 13 generates a prediction vector of each PU to be inter-prediction encoded, according to the applying vector mode that has been determined by the encoding control unit 12. Thereafter, the source encoding unit 13 calculates a prediction error signal between the motion vector of the PU and the prediction vector. The source encoding unit 13 provides the prediction error signal of the motion vector of each PU to be inter-prediction encoded to the entropy encoding unit 17.

When the prediction error signal is calculated, the source encoding unit 13 performs orthogonal transformation of the prediction error signals of each TU in the CTU to be encoded, thereby determining the orthogonal transform coefficients that represent a horizontal frequency component and a vertical frequency component of the prediction error signals. For example, the source encoding unit 13 performs discrete cosine transformation (DCT) as the orthogonal transformation processing on the prediction error signal, thereby obtaining a set of DCT coefficients as the orthogonal transform coefficients.

After the orthogonal transform coefficients of each TU are calculated, the source encoding unit 13 quantizes the orthogonal transform coefficients for each TU in the CTU to be encoded according to the quantization value of the quantization group to which the TU belongs, thereby calculating the quantized orthogonal transform coefficients. Note that, in the following, the quantized orthogonal transform coefficients may be also simply referred to as quantized coefficients. The source encoding unit 13 provides the quantized orthogonal transform coefficients to the decoding unit 14 and the entropy encoding unit 17.

The decoding unit 14 locally decodes the CTU to be encoded from the quantized coefficients of each TU in the CTU to be encoded in order to make the CTU to be encoded referenceable in the encoding of other CTU subsequent to the CTU to be encoded, and the like. Note that, in the following, the locally-decoded CTU to be encoded is referred to as the locally-decoded block. Therefore, the decoding unit 14 inversely quantizes the quantized coefficients of each TU according to the quantization value applied to each TU, thereby restoring the orthogonal transform coefficients before the quantization.

The decoding unit 14 performs inverse orthogonal transformation on the restored orthogonal transform coefficients for each TU. For example, when the source encoding unit 13 uses the DCT as the orthogonal transform, the decoding unit performs inverse DCT processing as the inverse orthogonal transformation. As a result, the decoding unit 14 restores the prediction error signals including information that is the same level as the prediction error signals before encoding, for each TU.

The decoding unit 14 adds the restored prediction error signals to the respective pixel values of the prediction block in each TU, thereby generating the locally-decoded block. The decoding unit 14 provides the locally-decoded block to the in-loop filter unit 15 every time the decoding unit 14 generates the locally-decoded block.

Further, the decoding unit 14 stores a locally-decoded picture in the storage unit 16. The locally-decoded picture is generated by combining the locally-decoded blocks processed with the in-loop filter, for one picture in encoding order of the CTU.

When the locally-decoded block is provided, the in-loop filter unit 15 performs the in-loop filter processing on the locally-decoded block. For example, the in-loop filter unit 15 performs deblocking filter processing and SAO filter processing, as the in-loop filter processing.

The in-loop filter unit 15 performs deblocking filter processing on the locally-decoded block, and then performs SAO filter processing on the pixels in the locally-decoded block, according to the SAO mode determined by the encoding control unit 12. The in-loop filter unit 15 may perform, as the deblocking filter processing, deblocking filter processing defined by HEVC on the locally-decoded block.

Figure 5:
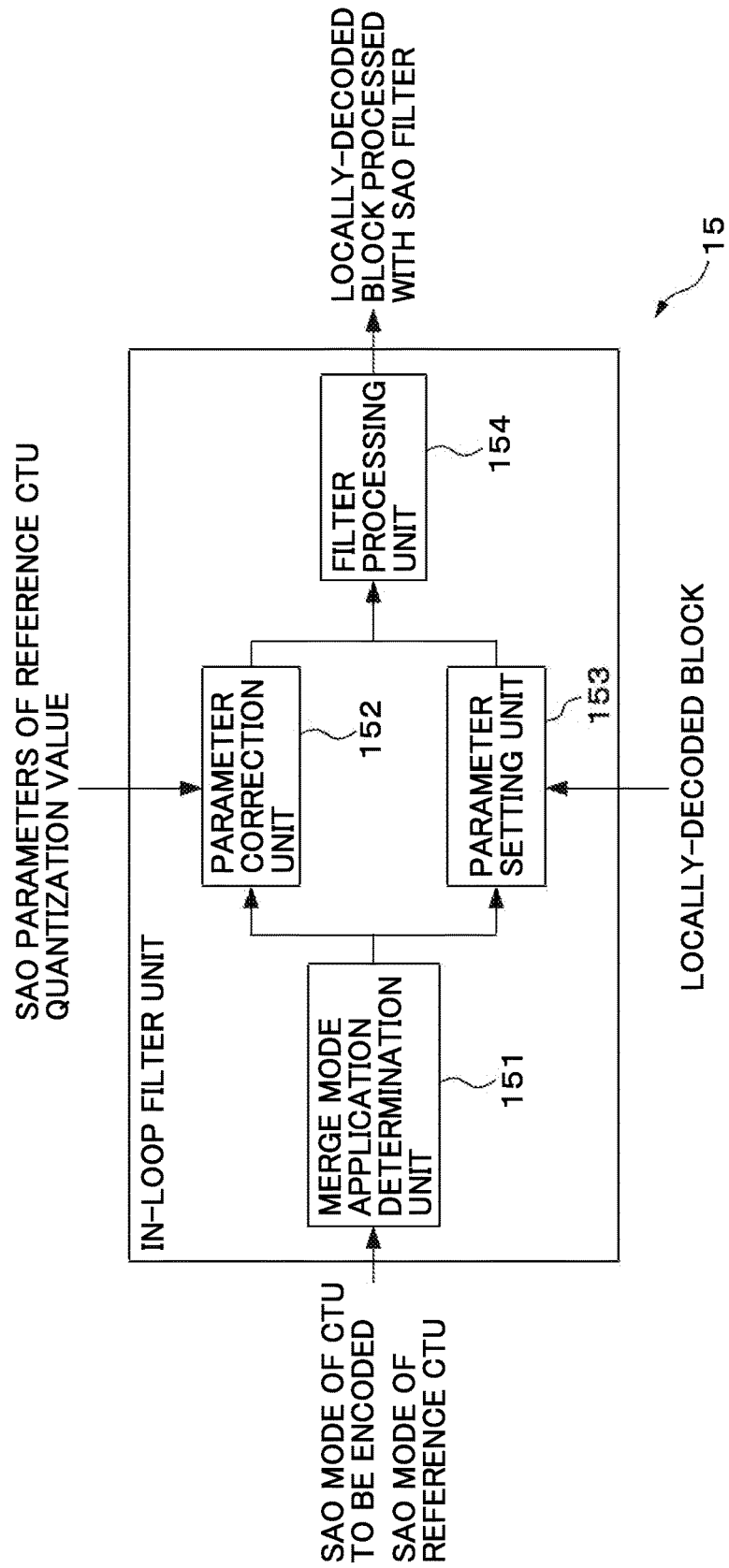
FIG. 5 is a block diagram of an in-loop filter unit of the video encoding apparatus, relating to SAO filter processing.

FIG. 5 is a block diagram of the in-loop filter unit 15, relating to SAO filter processing. The in-loop filter unit 15 includes a merge mode application determination unit 151, a parameter correction unit 152, a parameter setting unit 153, and a filter processing unit 154.

The merge mode application determination unit 151 is an example of a determination unit. The merge mode application determination unit 151 determines whether the SAO mode applied to the encoded CTU adjacent to the CTU to be encoded, i.e., the CTU adjacent to the left side or the upper side of the CTU to be encoded, and the SAO mode applied to the CTU to be encoded are both edge offset. When the edge offset is applied to one of the CTUs adjacent to the left side and the upper side of the CTU to be encoded and the edge offset is applied to the CTU to be encoded, the merge mode application determination unit 151 determines to apply the merge mode to the CTU to be encoded. The merge mode application determination unit 151 sets the values of respective flags SaoMergeLeftFlag and SaoMergeUpFlag so as to indicate reference of the CTU to which the edge offset is applied, out of the two adjacent CTUs. Note that, when the edge offset is applied to both of the CTUs adjacent to the left side and the upper side of the CTU to be encoded, the merge mode application determination unit 151 may set to refer any of the two adjacent CTUs. The merge mode application determination unit 151 may calculate a statistic representative value (such as a mean value, a median, and a mode) among the quantization values of the respective quantization groups included in the CTU to be encoded and a statistic representative value among the quantization values of the respective quantization groups included in each of the two adjacent CTUs. Further, the merge mode application determination unit 151 may refer to, out of the two adjacent CTUs, the CTU having the statistic representative value among the quantization values that is close to the statistic representative value among the quantization values of the CTU to be encoded.

The merge mode application determination unit 151 notifies the parameter correction unit 152 and the parameter setting unit 153 of a result of the determination whether the merge mode is applied to the CTU to be encoded. Further, the merge mode application determination unit 151 sets the value of a flag that indicates whether or not the merge mode is applied to the CTU to be encoded and indicates the adjacent CTU to be referred to for the merge mode, and notifies the entropy encoding unit 17 of the flag.

The parameter correction unit 152 is an example of a correction unit. When the merge mode is applied to the CTU to be encoded, the parameter correction unit 152 corrects the SAO parameters of the adjacent CTU to be referred, based on the quantization values of the respective quantization groups belonging to the adjacent CTU and the quantization values of the respective quantization groups belonging to the CTU to be encoded. Note that, in the following, the adjacent CTU to be referred to is simply referred to as reference CTU for convenience of description.

In the present embodiment, the parameter correction unit 152 corrects the offset values of the respective categories of the reference CTU in the edge offset, by the following equations.

$$O'x = Int(Ox*Qcurr/Qprev)$$

$$Qprev = levelScale[qPprev\%6] << (qPprev/6)$$

$$Qcurr = levelScale[qPcurr\%6] << (qPcurr/6) \quad (2)$$

where Ox is an offset value of the category x (x=[0, 3]) in the reference CTU, O'x is a corrected offset value of the category x. Further, qPprev is a quantization value of the reference CTU, and qPcurr is a quantization value of the CTU to be encoded. Furthermore, levelScale[ i ] (i=[0, 5]) is a quantization scale corresponding to the quantization value, and for example, levelScale [i] (i=[0, 5]) are {40, 45, 51, 57, 64, and 72}.

When only one quantization group is included in the reference CTU, the quantization value qPprev may be a quantization value applied to the quantization group. In contrast, when a plurality of quantization groups are included in the reference CTU, the quantization value qPprev may be a statistic representative value (such as a mean value, a median, and a mode) among the quantization values of the respective quantization groups. Alternatively, the quantization value qPprev may be a quantization value applied to the last quantization group in encoding order, among the plurality of quantization groups included in the reference CTU.

Likewise, when only one quantization group is included in the CTU to be encoded, the quantization value qPcurr may be a quantization value applied to the quantization group. In contrast, when a plurality of quantization groups are included in the CTU to be encoded, the quantization value qPcurr may be a statistic representative value (such as a mean value, a median, and a mode) among the quantization values of the respective quantization groups. Alternatively, the quantization value qPcurr may be a quantization value applied to the first quantization group in encoding order, among the plurality of quantization groups included in the CTU to be encoded. As described above, even when the plurality of quantization groups are included in the CTU to be encoded or the reference CTU, the parameter correction unit 152 can appropriately correct the offset values of the respective categories by determining the quantization value applied to the CTU to be encoded and the quantization value applied to the reference CTU.

The parameter correction unit 152 notifies the filter processing unit 152 of the corrected offset values of the respective categories.

The parameter setting unit 153 is an example of a filter coefficient calculation unit. When the merge mode is not applied to the CTU to be encoded, the parameter setting unit 153 determines the parameters of the SAO mode (the edge offset or the band offset) to be applied to the CTU to be encoded.

In other words, when the SAO mode to be applied is the edge offset, as described together with FIG. 1, the parameter setting unit 153 selects the edge direction of the locally-decoded block processed with the deblocking filter, and determines the categories of the respective pixels along the selected edge direction. Further, the parameter setting unit 153 determines the offset values of the respective categories. At this time, for example, the parameter setting unit 153 determines the offset values of the respective categories so as to minimize the sum of the absolute differences of pixel values of corresponding pixels between the original CTU to be encoded and the locally-decoded block processed with the deblocking filter and the edge offset. Moreover, the parameter setting unit 153 notifies the filter processing unit 154 of the class indicating the selected edge direction, the categories of the respective pixels, and the offset values of the respective categories.

When the merge mode is applied to the CTU to be encoded, the parameter setting unit 153 performs processing similar to the above-described processing to select the edge direction, thereby determining the categories of the respective pixels. Thereafter, the parameter setting unit 153 notifies the filter processing unit 154 and the entropy encoding unit 17 of the class indicating the selected edge direction and the categories of the respective pixels.

Furthermore, when the band offset is applied to the CTU to be encoded, as described together with FIG. 2, the parameter setting unit 153 determines the ranges of the respective pixels in the locally-decoded block. Note that the upper limit values and the lower limit values of the respective ranges may be previously set. Further, the parameter setting unit 153 sets the offset values of the respective ranges. At this time, for example, the parameter setting unit 153 determines the offset values of the respective ranges so as to minimize the sum of the absolute differences of the pixel values of the corresponding pixels between the original CTU to be encoded and the locally-decoded block processed with the deblocking filter and the band offset.

The parameter setting unit 153 notifies the filter processing unit 154 and the entropy encoding unit 17 of the upper limit values, the lower limit values, and the offset values of the respective ranges.

The filter processing unit 154 performs the SAO filter processing of the applied SAO mode on the pixels in the locally-decoded block processed with the deblocking filter.

When the applied SAO mode is the edge offset, the filter processing unit 154 adds the offset value of the pixel value variation category of each of the pixels in the locally-decoded block to the value of each of the pixels. At this time, when the merge mode is applied to the locally-decoded block, the filter processing unit 154 uses, as the offset values of the respective categories, the corrected offset values calculated by the parameter correction unit 152. In contrast, when the merge mode is not applied to the locally-decoded block, the filter processing unit 154 may use, as the offset values of the respective categories, the offset values calculated by the parameter setting unit 153.

Further, when the applied SAO mode is the band offset, the filter processing unit 154 adds the offset value corresponding to the range of each of the pixels in the locally-decoded block, to the value of each of the pixels.

The filter processing unit 154 stores the locally-decoded block processed with the SAO filter, in the storage unit 16.

Figure 6:
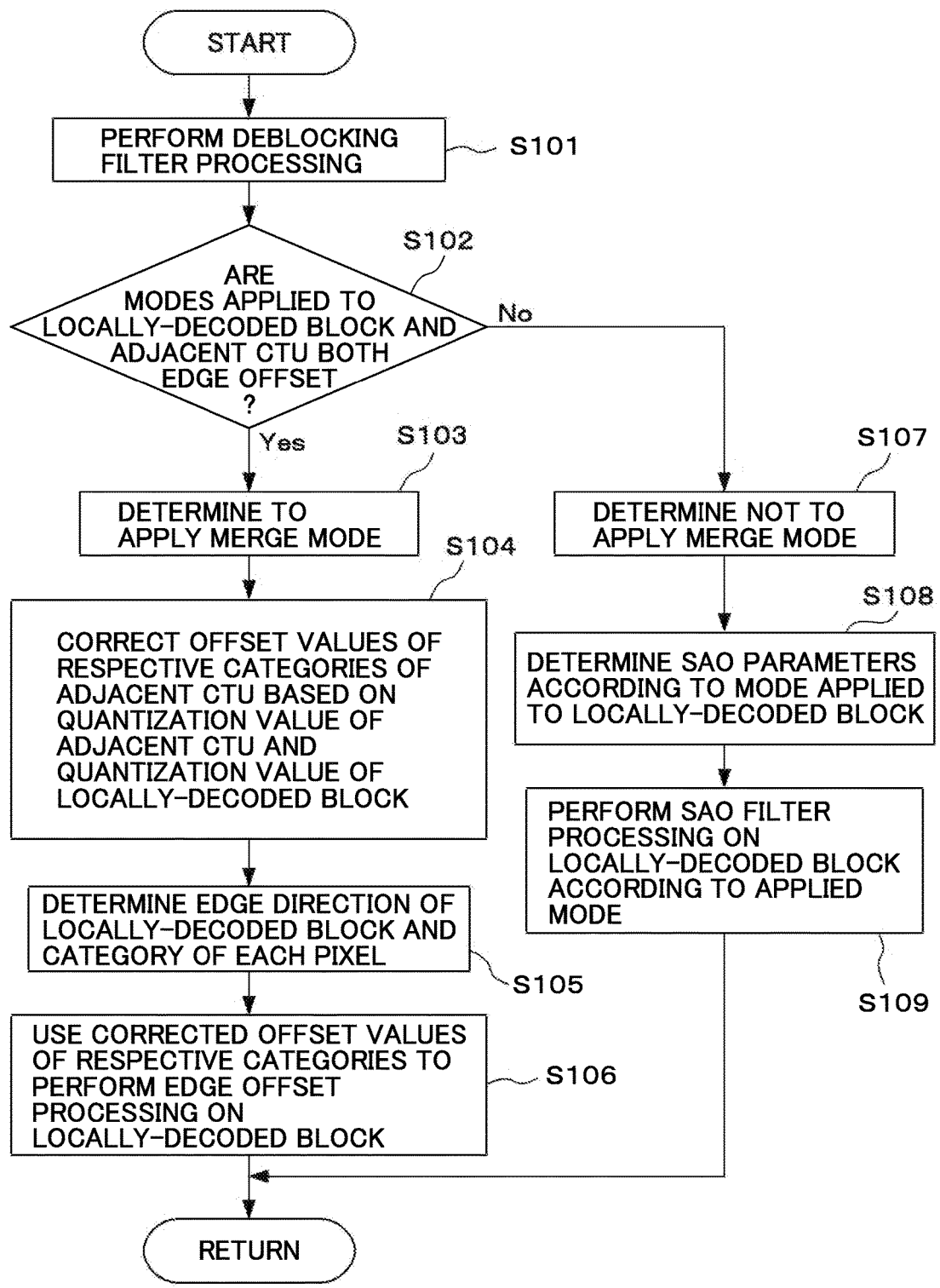
FIG. 6 is an operation flowchart of in-loop filter processing.

FIG. 6 is an operation flowchart of the in-loop filter processing performed by the in-loop filter unit 15. The in-loop filter unit 15 performs in-loop filter processing on each locally-decoded block according to the operation flowchart described below.

The in-loop filter unit 15 performs deblocking filter processing on the locally-decoded block (step S101).

The merge mode application determination unit 151 determines whether the SAO mode applied to the locally-decoded block and the SAO mode applied to the CTU adjacent to the left side or the upper side of the locally-decoded block are both edge offset (step S102).

When the SAO mode applied to the locally-decoded block and the SAO mode applied to the CTU adjacent to the left side or the upper side of the locally-decoded block are both edge offset (Yes in step S102), the merge mode application determination unit 151 determines to apply the merge mode to the locally-decoded block (step S103). Thereafter, the parameter correction unit 152 corrects the offset values of the respective categories in the reference CTU that is the adjacent CTU to which the edge offset is applied, based on the quantization value of the reference CTU and the quantization value of the locally-decoded block (step S104). The parameter correction unit 152 notifies the filter processing unit 154 of the corrected offset values of the respective categories. In addition, the parameter setting unit 153 determines the edge direction of the locally-decoded block and categories of the respective pixels in the locally-decoded block (step S105). Thereafter, the parameter setting unit 153 notifies the filter processing unit 154 of the edge direction of the locally-decoded block and the categories of the respective pixels in the locally-decoded block.

The filter processing unit 154 uses the corrected offset values of the respective categories to perform edge offset processing on the pixels in the locally-decoded block (step S106).

In contrast, when the SAO mode applied to the locally-decoded block is the band offset in step S102 (No in step S102), the merge mode application determination unit 151 determines not to apply the merge mode to the locally-decoded block (step S107). Further, when the SAO mode applied to the CTUs adjacent to the left side and the upper side of the locally-decoded block is the band offset, the merge mode application determination unit 151 determines not to apply the merge mode to the locally-decoded block. Thereafter, the parameter setting unit 153 determines the SAO parameters, based on the SAO mode applied to the locally-decoded block (step S108).

The filter processing unit 154 performs SAO filter processing on the pixels in the locally-decoded block based on the SAO mode applied to the locally-decoded block (step S109). After step S106 or S109, the in-loop filter unit 15 terminates the in-loop filter processing.

The storage unit 16 temporarily stores the locally-decoded block processed with the in-loop filter received from the in-loop filter unit 15. The storage unit 16 supplies the locally-decoded picture or the locally-decoded block to the motion searching unit 11, the encoding control unit 12, and the source encoding unit 13. Note that the storage unit 16 stores the predetermined number of locally-decoded pictures that may be referred as the picture to be encoded. When the number of locally-decoded pictures exceeds the predetermined number, the storage unit 16 discards the locally-decoded pictures in ascending order of encoding.

Further, the storage unit 16 stores the motion vectors of the respective locally-decoded blocks that have been inter-prediction encoded. Furthermore, the storage unit 16 stores combinations of the dividing mode of each of CU, PU, and TU and the encoding mode selected for each CTU.

The entropy encoding unit 17 is an example of an addition unit. The entropy encoding unit 17 performs entropy encoding on the quantization coefficients of the respective TUs, the prediction error signals of the motion vectors of the respective PUs, and various kinds of syntaxes that respectively indicate the dividing mode, the applied decoding mode, the quantization values of the respective groups, and the SAO parameters of the CTU to be encoded, etc. Thereafter, the entropy encoding unit 17 adds various kinds of entropy-encoded syntaxes to the entropy-encoded quantization coefficients and the like.

In the present embodiment, the entropy encoding unit 17 uses, as the entropy encoding scheme, arithmetic coding processing such as context-based adaptive binary arithmetic coding (CABAC). The entropy encoding unit 17 outputs a bit stream obtained through the entropy encoding.

The bit streams of the respective CTUs outputted from the entropy encoding unit 17 are combined in a predetermined order, and header information defined by HEVC and the like are added thereto, which results in the encoded bit stream including the encoded video data. The video encoding apparatus 1 stores the encoded bit stream in a storage device (not illustrated) that includes a magnetic recording medium, an optical recording medium, a semiconductor memory, or the like, or outputs the encoded bit stream to the other apparatus.

Figure 7:
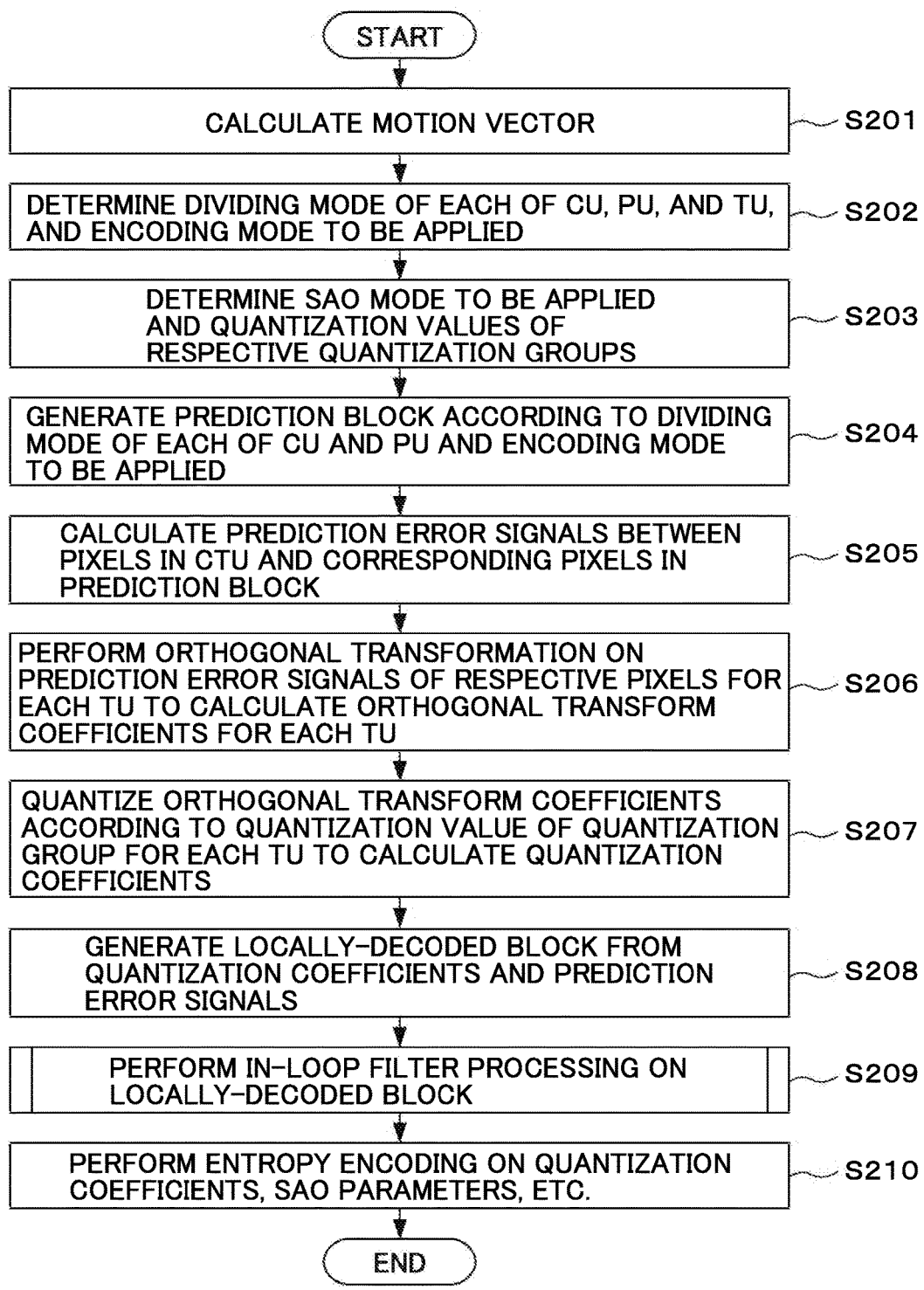
FIG. 7 is an operation flowchart of video encoding processing.

FIG. 7 is an operation flowchart of the video encoding processing performed by the video encoding apparatus 1. The video encoding apparatus 1 performs video encoding processing according to the operation flowchart described below for each CTU.

The motion searching unit 11 calculates the motion vectors of the respective applicable PUs in the CTU to be encoded (step S201). Thereafter, the motion searching unit 11 notifies the encoding control unit 12 of the motion vectors of the respective PUs. Note that, when the picture to be encoded including the CTU to be encoded is a B picture, the motion searching unit 11 calculates the motion vector in each of the L0 direction and the L1 direction. Further, when the picture to be encoded is an I picture, the process in step S201 may be omitted.

The encoding control unit 12 determines the dividing mode of each of CU, PU, and TU and the encoding mode to be applied, for the CTU to be encoded (step S202). Further, the encoding control unit 12 determines the SAO mode applied to the CTU to be encoded and the quantization values of the respective quantization groups included in the CTU to be encoded (step S203). Thereafter, the encoding control unit 12 notifies the source encoding unit 13 of the dividing mode of each of CU, PU and TU, the encoding mode to be applied, and the quantization values of the respective quantization groups. Moreover, the encoding control unit 12 notifies the in-loop filter unit 15 of the quantization values of the respective quantization groups and the SAO mode to be applied.

The source encoding unit 13 generates a prediction block according to the determined dividing mode of each of CU and PU and the encoding mode to be applied (step S204). Further, the source encoding unit 13 calculates prediction error signals between the pixels in the CTU to be encoded and the respective corresponding pixels in the prediction block (step S205).

The source encoding unit 13 performs the orthogonal transformation on the prediction error signals of the respective pixels for each TU, thereby calculating the orthogonal transform coefficients for each TU (step S206). Further, the source encoding unit 13 quantizes the orthogonal transform coefficients of the respective TUs in the CTU to be encoded, according to the quantization values of the quantization groups of the respective TUs, thereby calculating the quantization coefficients (step S207). Thereafter, the source encoding unit 13 outputs the quantization coefficients of the respective TUs to the decoding unit 14 and the entropy encoding unit 17.

The decoding unit 14 generates, from the quantization coefficients of the respective TUs in the CTU to be encoded, the locally-decoded block corresponding to the CTU (step S208). Further, the decoding unit 14 provides the locally-decoded block to the in-loop filter unit 15.

The in-loop filter unit 15 performs in-loop filter processing on the locally-decoded block (step S209). Further, the in-loop filter unit 15 stores the locally-decoded block processed with the in-loop filter, in the storage unit 16.

The entropy encoding unit 17 performs entropy encoding on the quantization coefficients, the prediction error of the motion vectors, etc., of the respective TUs in the CTU to be encoded. Further, the entropy encoding unit 17 performs entropy encoding on various kinds of syntaxes that include the SAO parameters and the quantization values of the respective quantization groups applied to the CTU to be encoded (step S210). The entropy encoding unit 17 outputs the resultant encoded bit stream. Thereafter, the video encoding apparatus 1 terminates the video encoding processing for one CTU.

As described above, when the SAO mode applied to the CTU to be encoded and the SAO mode applied to the reference CTU are the same as each other, the video encoding apparatus corrects the SAO parameters of the reference CTU based on the quantization values applied to the respective CTUs. In addition, the video encoding apparatus uses the corrected parameters to perform SAO filter processing on the CTU to be encoded. Accordingly, even if the quantization value applied to the CTU to be encoded and the quantization value applied to the reference CTU are different from each other, the video encoding apparatus can apply the SAO merge mode to the CTU to be encoded, and to suppress deterioration of image quality caused by a difference between the quantization values applied to the two CTUs. Consequently, the video encoding apparatus can improve encoding efficiency relating to the SAO while suppressing the deterioration of image quality.

Figure 8:
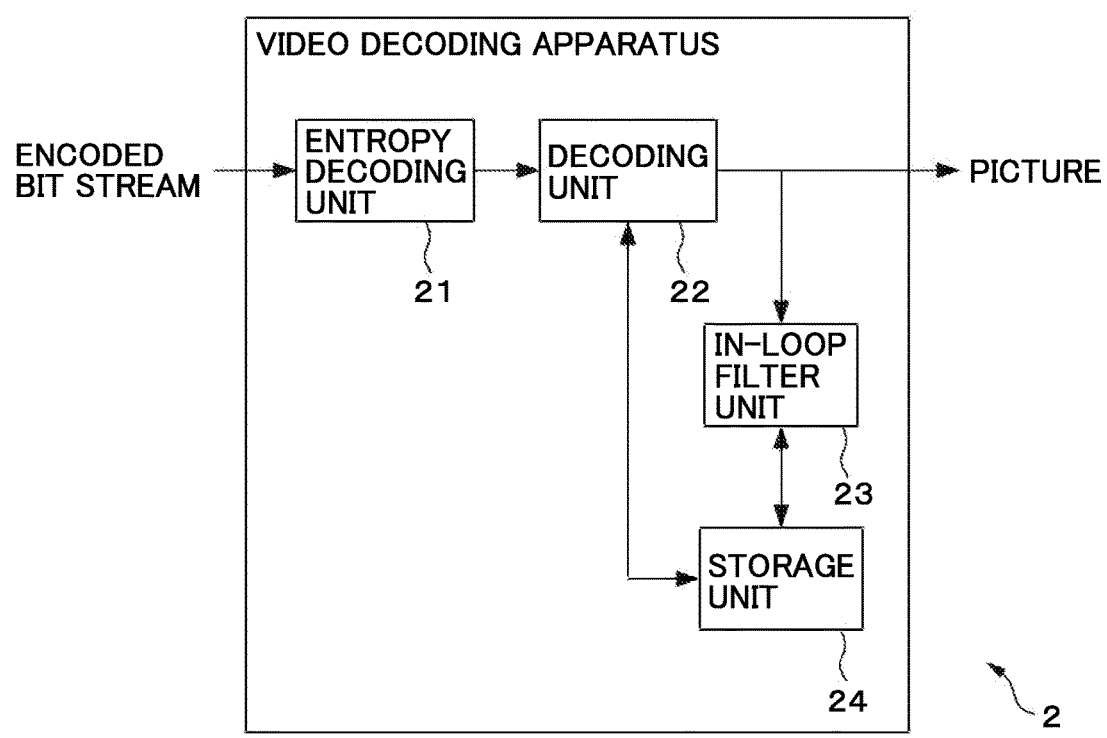
FIG. 8 is a schematic configuration diagram of a video decoding apparatus.

FIG. 8 is a schematic configuration diagram of a video decoding apparatus that decodes the video data encoded by the video encoding apparatus according to the above-described embodiment. A video decoding apparatus 2 includes an entropy decoding unit 21, a decoding unit 22, an in-loop filter unit 23, and a storage unit 24. These units included in the video decoding apparatus 2 are configured as separate circuits. Alternatively, these units included in the video decoding apparatus 2 may be mounted as one integrated circuit in which circuits corresponding to the respective units are integrated, on the video decoding apparatus 2. Further, these units included in the video decoding apparatus 2 may be functional modules each achieved by a computer program executed on a processor provided in the video decoding apparatus 2.

The video decoding apparatus 2 acquires the encoded bit stream including the encoded video data through, for example, a communication network and an interface circuit that connects the video decoding apparatus 2 to the communication network. In addition, the video decoding apparatus 2 stores the encoded bit stream in an unillustrated buffer memory. The video decoding apparatus 2 reads the encoded bit stream from the buffer memory on a CTU basis, and provides the encoded bit stream on a CTU basis to the entropy decoding unit 21.

The entropy decoding unit 21 performs entropy decoding on the encoded bit stream of the CTU to be decoded. At this time, the entropy decoding unit 21 may perform entropy decoding on the encoded bit stream according to the entropy encoding scheme adopted in the video encoding apparatus 1. Further, the entropy decoding unit 21 performs entropy decoding on the encoded bit stream, thereby restoring the quantization coefficients of the respective TUs in the CTU to be decoded. Moreover, the entropy decoding unit 21 restores the prediction error signals of the motion vectors of the respective PUs included in each of the inter-prediction encoded CUs. Further, the entropy decoding unit 21 restores the prediction modes of the respective PUs included in each of the intra-prediction encoded CUs.

Furthermore, the entropy decoding unit 21 restores the various kinds of syntaxes that include the applied dividing mode, the encoding mode, the quantization values of the respective quantization groups, and the SAO parameters. Thereafter, the entropy decoding unit 21 provides, to the decoding unit 22, the syntaxes indicating the dividing mode, the encoding mode, and the like, the prediction error signals of the motion vectors, the quantization coefficients, etc. Moreover, the entropy decoding unit 21 provides the SAO parameters to the in-loop filter unit 23.

The decoding unit 22 refers to the decoded picture or the decoded region of the picture to be decoded, thereby generating the prediction blocks of the respective PUs included in each of the CUs in the CTU to be decoded. At this time, the decoding unit 22 may perform processing similar to the processing of the source encoding unit 13 of the video encoding apparatus 1, thereby generating the prediction blocks. Further, the decoding unit 22 reproduces the motion vectors from information indicating the applied vector modes, the prediction error signals of the motion vectors, and the like.

The decoding unit 22 inversely quantizes the quantization coefficients of the respective TUs received from the entropy decoding unit 21 according to the decoded quantization values of the corresponding quantization groups of the respective TUs. The orthogonal transform coefficients of the respective TUs are restored by the inverse quantization. Thereafter, the decoding unit 22 performs inverse orthogonal transformation processing on the orthogonal transform coefficients for each of the TUs. The inverse quantization processing and the inverse orthogonal transformation processing are performed on the quantization coefficients of the respective TUs, which reproduces the prediction error signals of the respective pixels in the entire CTU.

The decoding unit 22 adds the corresponding reproduced prediction error signals to the respective pixel values of the prediction blocks in each of the PUs in the CTU to be decoded, thereby decoding the PUs. Thereafter, the decoding unit 22 combines the decoded PUs in the encoding order, thereby decoding the CTU. The decoding unit 22 provides the decoded CTU to the in-loop filter unit 23. In addition, the decoding unit 22 combines the CTU that has been decoded and has been processed with the in-loop filter by the in-loop filter unit 23, in the encoding order, thereby decoding the entire picture. The decoding unit 22 stores the decoded picture in the storage unit 24 and stores the decoded picture in the buffer memory. The decoded pictures stored in the buffer memory are outputted by the control unit (not illustrated) to the display apparatus (not illustrated) in the display order.

The in-loop filter unit 23 performs in-loop filter processing such as deblocking filter processing and SAO filter processing, on the decoded CTU, as with the in-loop filter unit 15 of the video encoding apparatus 1.

Figure 9:
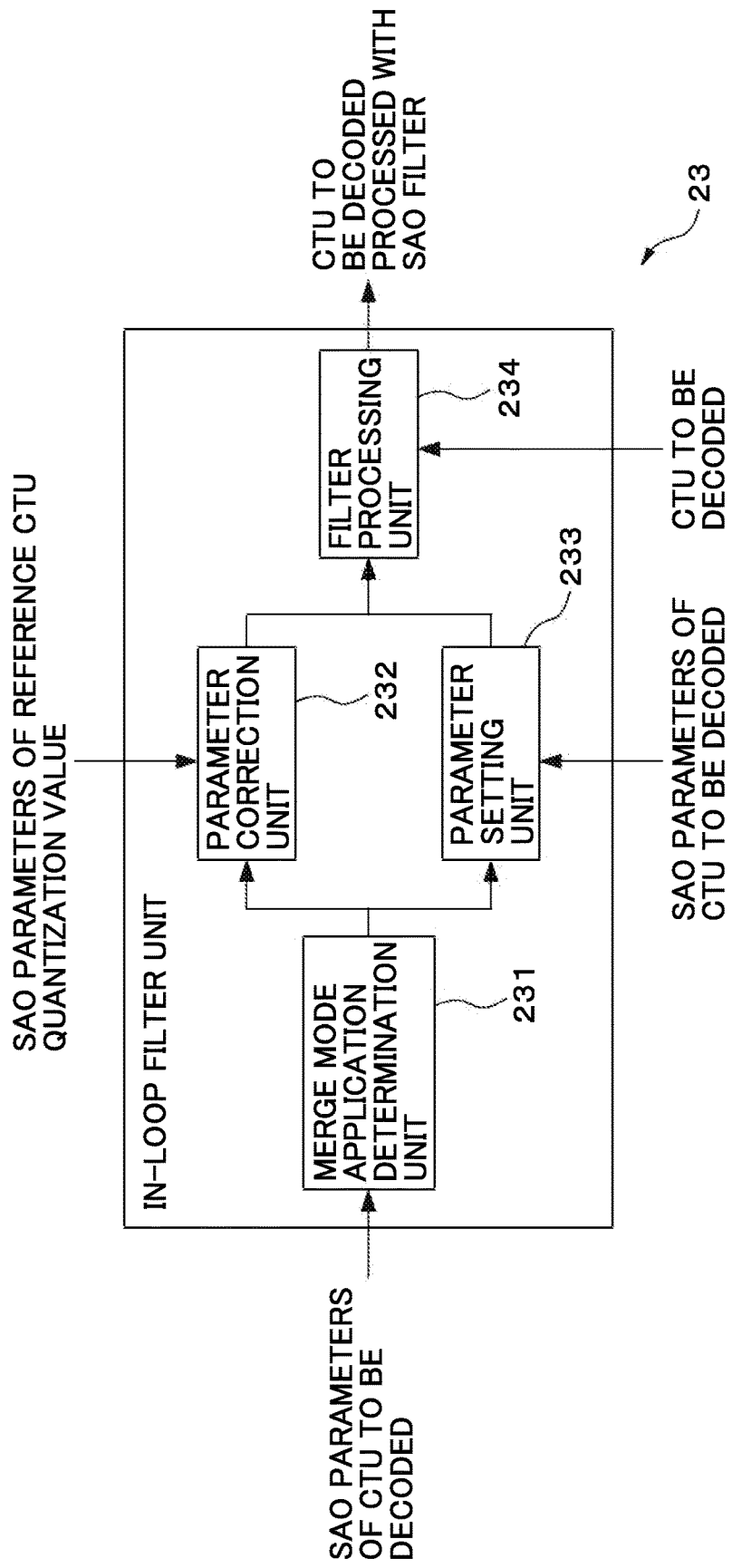
FIG. 9 is a block diagram of an in-loop filter unit of the video decoding apparatus, relating to SAO filter processing.

FIG. 9 is a block diagram of the in-loop filter unit 23, relating to SAO filter processing. The in-loop filter unit 23 includes a merge mode application determination unit 231, a parameter correction unit 232, a parameter setting unit 233, and a filter processing unit 234.

The merge mode application determination unit 231 refers to the decoded SAO parameters added to the CTU to be decoded, and determines whether the edge offset or the band offset is applied, or the SAO is not applied.

Further, the merge mode application determination unit 231 refers to the flags (SaoMergeLeftFlag and SaoMergeUpFlag) that indicate whether or not the SAO merge mode is applied to, and are added to the CTU to be decoded, and determines whether the merge mode is applied to the CTU to be decoded. In other words, when one of the two flags SaoMergeLeftFlag and SaoMergeUpFlag is '1', the merge mode application determination unit 231 determines that the merge mode is applied to the CTU to be decoded. Further, the merge mode application determination unit 231 specifies the reference CTU, based on the flag having the value '1' out of the two flags. The merge mode application determination unit 231 notifies the parameter correction unit 232 and the filter processing unit 234 of a result of the determination whether the merge mode is applied to the CTU to be decoded.

When the merge mode is applied to the CTU to be decoded, the parameter correction unit 232 corrects the offset values of the respective categories of the edge offset determined for the reference CTU according to the equation (2), as with the parameter correction unit 152 of the video encoding apparatus 1. Thereafter, the parameter correction unit 232 notifies the filter processing unit 234 of the corrected offset values of the respective categories.

When the edge offset is applied, the parameter setting unit 233 determines the categories of the respective pixels in the CTU to be decoded, as with the parameter setting unit 153 of the video encoding apparatus 1. In contrast, when the merge mode is not applied to the CTU to be decoded, the parameter setting unit 233 determines the offset values of the respective categories based on the decoded SAO parameters. Moreover, when the band offset is applied, the parameter setting unit 233 determines the possible range of the pixel values in each of the ranges, the ranges of the respective pixels, and the offset values of the respective ranges, based on the decoded SAO parameters.

The parameter setting unit 233 notifies the filter processing unit 234 of the determined various kinds of SAO parameters of the CTU to be decoded.

The filter processing unit 234 performs the SAO filter processing on the pixels in the CTU to be decoded, as with the filter processing unit 154 of the video encoding apparatus 1. At this time, when the edge offset is applied but the merge mode is not applied to the CTU to be decoded, the filter processing unit 234 uses the decoded offset values of the respective categories to perform the edge offset processing on the CTU to be decoded. In contrast, when the merge mode is applied to the CTU to be decoded, the filter processing unit 234 uses the corrected offset values of the respective categories to perform edge offset processing.

Moreover, when the band offset is applied to the CTU to be decoded, the filter processing unit 234 uses the decoded offset values of the respective ranges to perform band offset processing on the CTU to be decoded.

The storage unit 24 temporarily stores the CTU that has been decoded and processed with the in-loop filter and the decoded picture received from the decoding unit 22. The storage unit 24 supplies, to the decoding unit 22, the CTU as the reference region or the picture as the reference picture. Note that the storage unit 24 stores the predetermined number of pictures, and when the storing data amount exceeds the amount corresponding to the predetermined number, the storage unit 24 discards the pictures in an ascending order of encoding.

Figure 10:
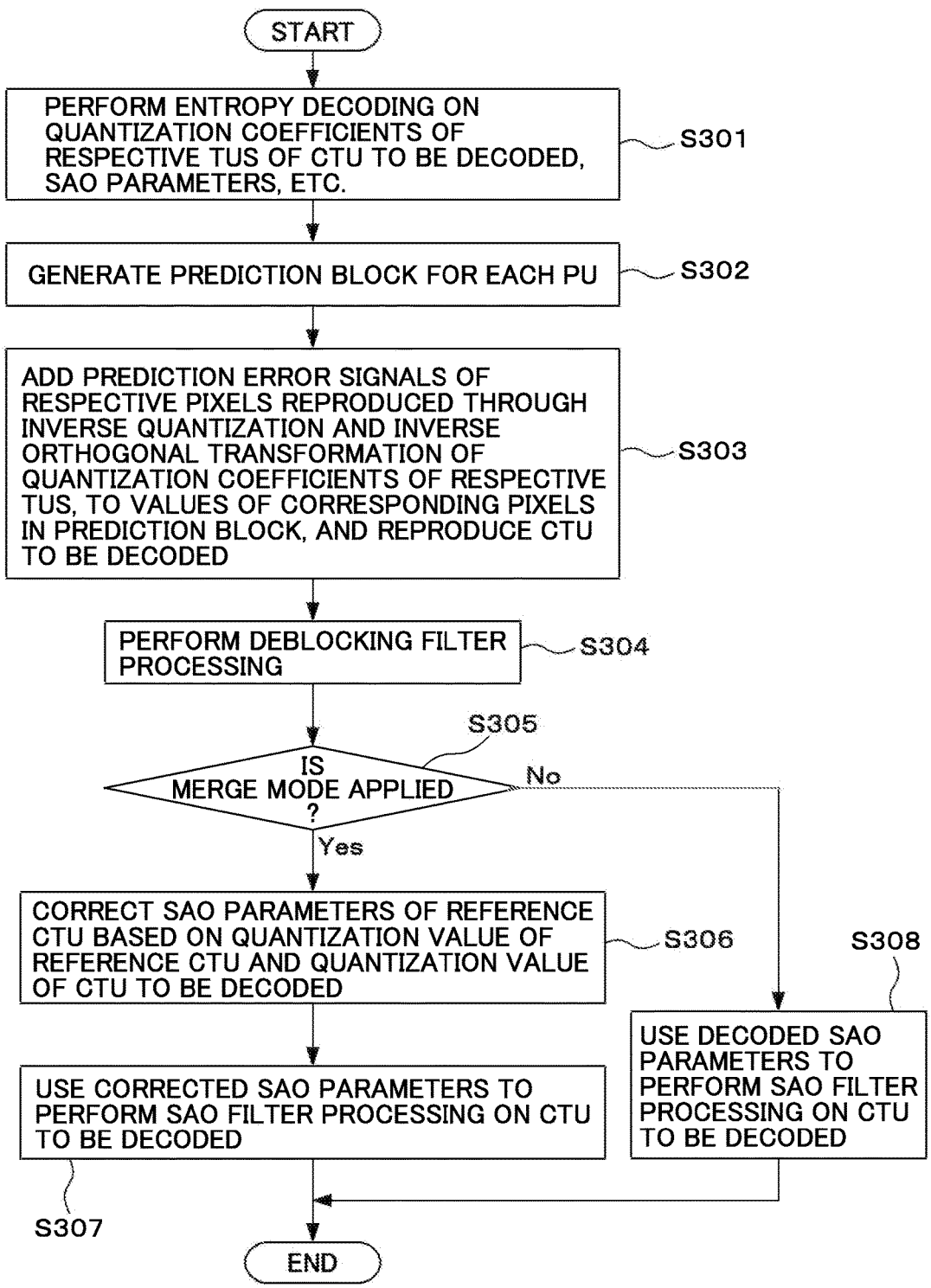
FIG. 10 is an operation flowchart of video decoding processing.

FIG. 10 is an operation flowchart of the video decoding processing performed by the video decoding apparatus 2. The video decoding apparatus 2 performs video decoding processing illustrated in FIG. 10 for each CTU to be decoded.

The entropy decoding unit 21 performs entropy decoding on the encoded bit stream of the CTU to be decoded, thereby reproducing the various kinds of syntaxes that include the quantization coefficients of the respective TUs, the quantization values of the respective quantization groups, and the SAO parameters of the CTU to be decoded (step S301).

The decoding unit 22 refers to the decoded picture or the decoded region of the picture to be decoded to generate a prediction block for each PU, according to the encoding mode applied to the CUs included in the CTU to be decoded (step S302).

The decoding unit 22 multiplies a predetermined number that corresponds to a quantization width determined by the quantization value, to the quantization coefficients received from the entropy decoding unit 21, thereby performing inverse quantization. Further, the decoding unit 22 performs inverse orthogonal transformation processing on the orthogonal transform signals on a TU basis, thereby reproducing the prediction error signals of the respective pixels in the CTU to be decoded. Thereafter, the decoding unit 22 adds the corresponding reproduced prediction error signals to the values of the respective pixels in the prediction block, thereby reproducing the CTU to be decoded (step S303). The decoding unit 22 provides the reproduced CTU to the in-loop filter unit 23.

The in-loop filter unit 23 performs deblocking filter processing on the reproduced CTU to be decoded (step S304). In addition, the merge mode application determination unit 231 of the in-loop filter unit 23 refers to the flag that indicates whether or not the SAO merge mode is applied to the reproduced CTU to be decoded, thereby determining whether the merge mode is applied (step S305). When the merge mode is applied (Yes in step S305), the merge mode application determination unit 231 refers to the flag to specify the reference CTU. In addition, the parameter correction unit 232 of the in-loop filter unit 23 corrects the SAO parameters of the reference CTU based on the quantization value of the reference CTU and the quantization value of the CTU to be decoded (step S306). The filter processing unit 234 of the in-loop filter unit 23 uses the corrected SAO parameters to perform SAO filter processing on the CTU to be decoded that has been reproduced and processed with the deblocking filter (step S307).

In contrast, when the merge mode is not applied (No in step S305), the filter processing unit 234 uses the decoded SAO parameters of the CTU to be decoded. Thereafter, the filter processing unit 234 performs SAO filter processing on the CTU to be decoded that has been reproduced and processed with the deblocking filter (step S308). After step S307 or S308, the in-loop filter unit 23 stores the CTU to be decoded that has been processed with the SAO filter, in the storage unit 24. Thereafter, the video decoding apparatus 2 terminates the video decoding processing of the CTU to be decoded.

As described above, the video decoding apparatus can apply the SAO merge mode to the reproduced CTU to be decoded even when different quantization values are applied to the reference CTU and the CTU to be decoded, by the above-described video encoding apparatus according to the embodiment.

Note that, according to a modification, when a plurality of quantization groups are included in the CTU to be encoded (decoded) and the SAO merge mode is applied to the CTU to be encoded, the offset values of the respective categories of the edge offset may be corrected for each quantization group. In this case, the parameter correction unit 152 of the video encoding apparatus 1 and the parameter correction unit 232 of the video decoding apparatus 2 may calculate the corrected offset values of the respective categories for each quantization group, according to equation (2). In this case, however, the parameter correction unit 152 and the parameter correction unit 232 may use the quantization value of the quantization group of interest as the quantization value qPcurr in equation (2).

According to this modification, even when a plurality of quantization groups are included in the CTU to be encoded (decoded) and different quantization values are used for the respective quantization groups, it is possible to calculate offset values which are appropriate for each of the quantization groups.

In addition, according to another modification, the parameter correction unit 152 and the parameter correction unit 232 may use, as the variable Qcurr in equation (2), the quantization value of the CTU to be encoded (decoded) or the quantization values qPcurr of the respective quantization groups included in the CTU to be encoded (decoded), to correct the offset values of the respective categories. Likewise, the parameter correction unit 152 and the parameter correction unit 232 may use the quantization value qPprev of the reference CTU as the variable Qprev in equation (2), to correct the offset values of the respective categories.

Further, according to still another modification, even when the band offset is applied to both of the CTU to be encoded and the encoded CTU adjacent to the upper side or the left side of the CTU to be encoded, the merge mode application determination unit 151 may determine that the merge mode is applied to the CTU to be encoded. In this case, the merge mode application determination unit 151 may regard the CTU to which the band offset is applied as the reference CTU out of the two encoded CTUs adjacent to the upper side and the left side of the CTU to be encoded. Further, the parameter correction unit 152 and the parameter correction unit 232 may correct the offset values of the respective ranges of the reference CTU according to equation (2). Note that the offset values of the respective ranges of the band offset are other examples of the filter coefficients of the in-loop filter. In other words, the parameter correction unit 152 and the parameter correction unit 232 set Ox and O'x (x=[0, m−1], where m is the total number of ranges) to the offset values of the respective ranges and the corrected offset values in equation (2). Further, the filter processing unit 154 of the video encoding apparatus 1 and the filter processing unit 234 of the video decoding apparatus 2 may use the corrected offset values of the respective ranges in the CTU to be encoded (decoded). Moreover, in this modification, the offset values of the respective ranges may be corrected for each quantization group included in the CTU to be encoded (decoded). According to the present modification, the number of CTUs that are application targets of the merge mode is increased, which allows for further improvement of encoding efficiency.

Further, according to a still another modification, the encoding control unit 12 of the video encoding apparatus 1 may determine whether the SAO merge mode is applied to the CTU to be encoded. In this case, when the edge offset is applied the encoded CTU adjacent to the upper side or the left side of the CTU to be encoded, the encoding control unit 12 may calculate the encoding cost in a case where merge mode in the edge offset is applied, according to equation (1). Likewise, when the band offset is applied to the encoded CTU adjacent to the upper side or the left side of the CTU to be encoded, the encoding control unit 12 may calculate the encoding cost in a case where the merge mode in the band offset is applied, according to equation (1). Further, when the encoding cost is the smallest in the case where the merge mode in the edge offset is applied, the encoding control unit 12 may determine to apply the merge mode in the edge offset to the CTU to be encoded. Moreover, when the encoding cost is the smallest in the case where the merge mode in the band offset is applied, the encoding control unit 12 may determine to apply the merge mode in the band offset to the CTU to be encoded.

According to the present modification, the video encoding apparatus can more appropriately determine the application propriety of the merge mode. Note that, according to the present modification, the merge mode application determination unit 151 may be omitted.

According to still another embodiment, the in-loop filter unit 15 of the video encoding apparatus 1 and the in-loop filter unit 23 of the video decoding apparatus 2 may omit deblocking filter processing.

According to still another embodiment, an adaptive filter other than the SAO filter may be used as the in-loop filter. In this case, the filter coefficients of the adaptive filter applied to the reference CTU may be corrected based on the quantization value applied to the CTU to be encoded and the quantization value applied to the reference CTU, according to equation (2), as with the above-described embodiment and modifications. Further, the corrected filter coefficients may be applied to the locally-decoded block of the CTU to be encoded.

The video encoding apparatus and the video decoding apparatus according to any of the above-described embodiment and modifications are used for various applications. The video encoding apparatus and the video decoding apparatus are incorporated in, for example, a video transmitter, a video receiver, a video telephone system, a virtual desktop system, a computer, or a mobile phone.

Figure 11:
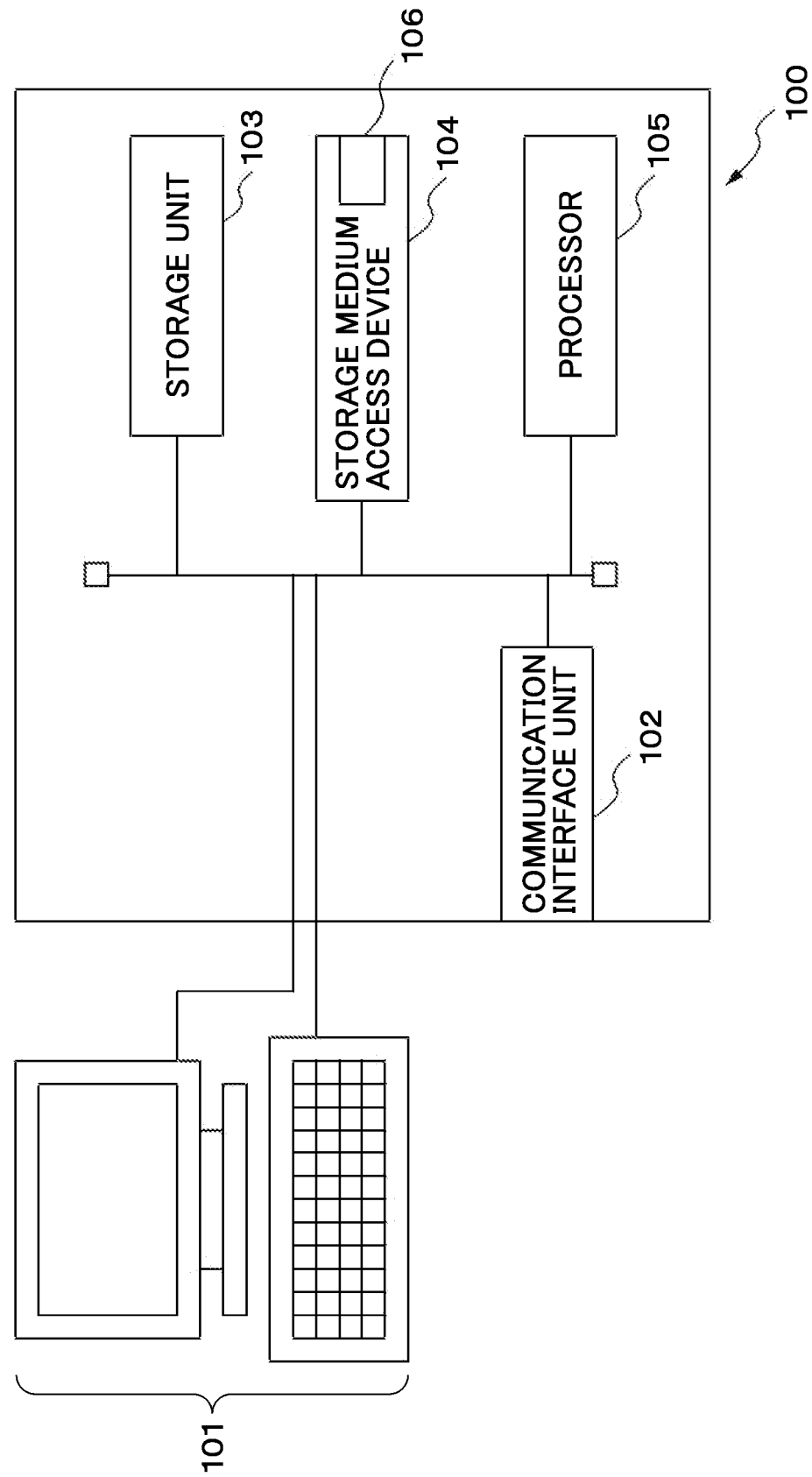
FIG. 11 is a configuration diagram of a computer that operates as a video encoding apparatus or a video decoding apparatus by executing a computer program that achieves the functions of the respective units in the video encoding apparatus or the video decoding apparatus according to any of the embodiment or the modifications thereof.

FIG. 11 is a configuration diagram of a computer that operates as a video encoding apparatus or a video decoding apparatus through execution of computer programs that achieve the functions of the respective units in the video encoding apparatus or the video decoding apparatus according to any of the above-described embodiment and modifications.

A computer 100 includes a user interface unit 101, a communication interface unit 102, a storage unit 103, a storage medium access device 104, and a processor 105. The processor 105 is connected to the user interface unit 101, the communication interface unit 102, the storage unit 103, and the storage medium access device 104 through, for example, a bus.

The user interface unit 101 includes an input device such as a keyboard and a mouse, and a display such as a liquid crystal display. Alternatively, the user interface unit 101 may include a device in which the input device and the display are integrated, such as a touch panel display. The user interface unit 101 outputs, to the processor 105, an operation signal that selects video data to be encoded or encoded video data to be decoded, for example, in response to user operation. Moreover, the user interface unit 101 may display the decoded video data received from the processor 105.

The communication interface unit 102 may include a communication interface and a control circuit thereof. The communication interface is used to connect the computer 100 to an apparatus generating video data such as a video camera. Examples of such a communication interface include a universal serial bus (USB).

Further, the communication interface unit 102 may include a communication interface to connect the computer 100 to communication network in accordance with communication standards such as Ethernet (registered trademark), and a control circuit of the communication interface.

In this case, the communication interface unit 102 acquires the video data to be encoded or the encoded bit stream including the encoded video data to be decoded, from the other apparatus connected to the communication network, and provides the data to the processor 105. In addition, the communication interface unit 102 may outputs the encoded video data or the decoded video data received from the processor 105, to the other apparatus through the communication network.

The storage unit 103 includes, for example, a readable/writable semiconductor memory and a read-only semiconductor memory. The storage unit 103 stores computer programs to execute video encoding processing or video decoding processing that is executed on the processor 105, and data generated during processing or generated as a result.

The storage medium access device 104 may be a device accessing a storage medium 106 such as a magnetic disk, a semiconductor memory card, and an optical storage medium. The storage medium access device 104 reads, for example, computer programs for the video encoding processing or the video decoding processing that are stored in the storage medium 106 and which are executed on the processor 105, and provides the computer programs to the processor 105.

The processor 105 performs the computer programs for video encoding processing according to any of the above-described embodiment and modifications, thereby generating the encoded video data. Further, the processor 105 stores the generated encoded video data in the storage unit 103 or outputs the generated encoded video data to the other apparatuses through the communication interface unit 102. Furthermore, the processor 105 performs the computer programs for video decoding processing according to any of the above-described embodiment and modifications, thereby decoding the encoded video data. In addition, the processor 105 stores the decoded video data in the storage unit 103 and displays the decoded video data on the user interface unit 101, or outputs the decoded video data to the other apparatuses through the communication interface unit 102.

Note that the computer programs that execute, on the processor, the functions of the respective units in the video encoding apparatus 1 may be provided in a recorded form on a computer-readable medium. Likewise, the computer programs that execute, on the processor, the functions of the respective units in the video decoding apparatus 2 may be provided in a recorded form on a computer-readable medium. Such recording media, however, do not include carrier waves.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A video encoding apparatus that encodes a block to be encoded among a plurality of blocks obtained by dividing a picture to be encoded, included in video data, the video encoding apparatus comprising:
    a processor configured to:
        perform orthogonal transformation on prediction error signals of respective pixels in the block to be encoded, to calculate orthogonal transform coefficients, and quantize the orthogonal transform coefficients based on a quantization value applied to the block to be encoded, to encode the block to be encoded;
        decode the encoded block to be encoded, to generate a locally-decoded block;
        correct filter coefficients of an in-loop filter applied to an encoded reference block adjacent to the block to be encoded, based on a quantization value applied to the reference block and the quantization value applied to the block to be encoded, to calculate corrected filter coefficients, when a mode of an in-loop filter applied to the block to be encoded is the same as a mode of the in-loop filter applied to the reference block;
        use the corrected filter coefficients to apply the in-loop filter to the locally-decoded block; and
        add, to encoded data of the block to be encoded, information indicating that the block to be encoded refers to the reference block for the in-loop filter.

2. The video encoding apparatus according to claim 1, wherein when a plurality of quantization groups to which the quantization values are individually settable are included in the block to be encoded, correction of the filter coefficients includes calculating the corrected filter coefficients, with use of a statistic representative value calculated from the quantization values of the respective quantization groups, as the quantization value of the block to be encoded.

3. The video encoding apparatus according to claim 1, wherein when a plurality of quantization groups to which the quantization values are individually settable are included in the block to be encoded, correction of the filter coefficients includes calculating the corrected filter coefficients, with use of the quantization value of a first quantization group in encoding order among the plurality of quantization groups, as the quantization value of the block to be encoded.

4. The video encoding apparatus according to claim 1, wherein
when a plurality of quantization groups to which the quantization values are individually settable are included in the block to be encoded, correction of the filter coefficients includes calculating, for each of the quantization groups, the corrected filter coefficients of the quantization group, with use of the quantization value of the quantization group as the quantization value of the block to be encoded, and
using the corrected filter coefficients includes using, for each of the quantization groups, the corrected filter coefficients calculated for the quantization group to apply the in-loop filter to the quantization group in the locally-decoded block.

5. The video encoding apparatus according to claim 1, wherein when the mode of the in-loop filter applied to the reference block and the mode of the in-loop filter applied to the block to be encoded are both an edge offset of a sample adaptive offset, correction of the filter coefficients includes correcting offset values of respective categories of pixel value variation serving as the filter coefficients applied to the reference block to calculate corrected offset values of the respective categories as the corrected filter coefficients.

6. The video encoding apparatus according to claim 5, wherein correction of the filter coefficients includes calculating the corrected offset values of the respective categories so that the corrected offset values are larger as a ratio of the quantization value applied to the block to be encoded to the quantization value applied to the reference block is larger.

7. The video encoding apparatus according to claim 1, wherein when the mode of the in-loop filter applied to the reference block and the mode of the in-loop filter applied to the block to be encoded are both a band offset of a sample adaptive offset, correction of the filter coefficients includes correcting offset values of respective ranges of pixel values serving as the filter coefficients applied to the reference block to calculate the corrected offset values of the respective ranges as the corrected filter coefficients.

8. The video encoding apparatus according to claim 1, wherein the processor is further configured to:
calculate the corrected filter coefficient when the mode of the in-loop filter applied to the block to be encoded and the mode of the in-loop filter applied to the reference block are the same as each other, but calculate the filter coefficients of the in-loop filter, based on values of the respective pixels in the block to be encoded when the mode of the in-loop filter applied to the block to be encoded and the mode of the in-loop filter applied to the reference block are different from each other, wherein
using the corrected filter coefficients includes using the corrected filter coefficients to apply the in-loop filter to the locally-decoded block when the corrected filter coefficients are calculated, and using the filter coefficients to apply the in-loop filter to the locally-decoded block when the filter coefficients are calculated.

9. A video encoding method that encodes a block to be encoded among a plurality of blocks obtained by dividing a picture to be encoded, included in video data, the method comprising:
performing orthogonal transformation on prediction error signals of respective pixels in the block to be encoded, to calculate orthogonal transform coefficients, and
quantizing the orthogonal transform coefficients based on a quantization value applied to the block to be encoded, to encode the block to be encoded;
decoding the encoded block to be encoded, to generate a locally-decoded block;
correcting filter coefficients of an in-loop filter applied to an encoded reference block adjacent to the block to be encoded, based on a quantization value applied to the reference block and the quantization value applied to the block to be encoded, to calculate corrected filter coefficients, when a mode of an in-loop filter applied to the block to be encoded is same as a mode of the in-loop filter applied to the reference block;
using the corrected filter coefficients to apply the in-loop filter to the locally-decoded block; and
adding, to encoded data of the block to be encoded, information indicating that the block to be encoded refers to the reference block for the in-loop filter.

10. A video decoding apparatus that decodes a block to be decoded among a plurality of blocks obtained by dividing a picture to be decoded, included in encoded video data, the video decoding apparatus comprising:
a processor configured to:
inversely quantize quantization coefficients included in encoded data of the block to be decoded, based on a quantization value applied to the block to be decoded, to calculate orthogonal transform coefficients;
perform inverse orthogonal transformation on the orthogonal transform coefficients to calculate prediction error signals of respective pixels in the block to be decoded;
decode the block to be decoded, based on the prediction error signals of the respective pixels;
correct filter coefficients of an in-loop filter applied to a decoded reference block adjacent to the block to be decoded, included in the encoded video data, based on a quantization value applied to the reference block and the quantization value applied to the block to be decoded, to calculate corrected filter coefficients, when information indicating that the reference block is referred to for an in-loop filter is included in the encoded data of the block to be decoded; and
use the corrected filter coefficients to apply the in-loop filter to the decoded block to be decoded.

11. A video decoding method that decodes a block to be decoded among a plurality of blocks obtained by dividing a picture to be decoded, included in encoded video data, the method comprising:
inversely quantizing quantization coefficients included in encoded data of the block to be decoded, based on a quantization value applied to the block to be decoded, to calculate orthogonal transform coefficients;
performing inverse orthogonal transformation on the orthogonal transform coefficients to calculate prediction error signals of respective pixels in the block to be decoded;
decoding the block to be decoded, based on the prediction error signals of the respective pixels;
correcting filter coefficients of an in-loop filter applied to a decoded reference block adjacent to the block to be decoded, included in the encoded video data, based on a quantization value applied to the reference block and the quantization value applied to the block to be decoded, to calculate corrected filter coefficients, when information indicating that the reference block is referred to for an in-loop filter is included in the encoded data of the block to be decoded; and using the corrected filter coefficients to apply the in-loop filter to the decoded block to be decoded.

\* \* \* \* \*